United States Patent [19]
Okumura et al.

[11] Patent Number: 5,974,493
[45] Date of Patent: *Oct. 26, 1999

[54] MICROCOMPUTER WITH PROCESSOR BUS HAVING SMALLER WIDTH THAN MEMORY BUS

[75] Inventors: Naoto Okumura; Katsumi Dosaka; Yukari Takata, all of Tokyo, Japan

[73] Assignee: Mitsubishi Denki Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/674,873

[22] Filed: Jul. 2, 1996

[30] Foreign Application Priority Data

Feb. 26, 1996 [JP] Japan .................................. 8-038494

[51] Int. Cl.⁶ .................................................. G06F 13/00
[52] U.S. Cl. ............................................. 710/127; 710/66
[58] Field of Search ................................. 395/307, 886; 364/488–491; 710/127, 66

[56] References Cited

U.S. PATENT DOCUMENTS

| | | | |
|---|---|---|---|
| 5,253,181 | 10/1993 | Marui et al. | 364/489 |
| 5,255,378 | 10/1993 | Crawford et al. | 395/307 |
| 5,293,603 | 3/1994 | MacWilliams | 395/465 |
| 5,438,681 | 8/1995 | Mensh, Jr. | 364/490 |
| 5,588,124 | 12/1996 | Hongo | 395/307 |
| 5,613,078 | 3/1997 | Kishigami | 395/306 |
| 5,627,991 | 5/1997 | Hose, Jr. et al. | 395/456 |
| 5,630,099 | 5/1997 | MacDonald et al. | 395/497.03 |

FOREIGN PATENT DOCUMENTS

| | | |
|---|---|---|
| 63-081569 | 4/1988 | Japan . |
| 2-087283 | 3/1990 | Japan . |
| 5-094366 | 4/1993 | Japan . |
| 7-153257 | 6/1995 | Japan . |

OTHER PUBLICATIONS

Murakami et al., "Proposal of New General–Purpose Functional Part PPRAM Toward 21st Century," *Computer Architecture Research Report*, No. 108, 94–ARC–108, pp. 49–56, *The Information Processing Society, Research Report*, vol. 94, No. 91, ISSN 0919–6072 (Oct. 28, 1994).

*Primary Examiner*—Ayaz R. Sheikh
*Assistant Examiner*—David A. Wiley
*Attorney, Agent, or Firm*—Burns, Doane, Swecker & Mathis, LLP

[57] ABSTRACT

A microcomputer comprises a processor, a memory and a buffer including a selector for changing a bus width, wherein a processor bus has a smaller width than that of a memory bus. The microcomputer further comprises a bus interface unit which has a selector for changing the bus width, and is used for inputting/outputting signals from/to the outside, and an external bus for connecting the bus interface unit and the outside, wherein the bus interface unit is connected to the memory via the memory bus, and the external bus has a smaller width than that of the memory bus. Still further the memory includes a plurality of memory regions, and the processor is disposed in a space of the memory regions.

38 Claims, 37 Drawing Sheets

MICROCOMPUTER WITH PROCESSOR BUS HAVING SMALLER WIDTH THAN MEMORY BUS

BACKGROUND OF THE INVENTION

1. Field of the Invention

The present invention generally relates to a microcomputer which includes a processor and a memory integrated on the same substrate, and more particularly to a circuit configuration between the processor and the memory, and a layout of buses for connecting the processor and the memory.

2. Description of the Related Art

When a processor and a memory are not integrated on the same chip, and a bus between the processor and the memory is wide enough not to decrease a processing function of the processor, it is necessary to provide respective chips loading the processor and loading the memory with pins for the connection therebetween. This unavoidably increases power consumption and production costs. To solve these problems and to improve a processing efficiency of the processor, there are arts of active interest for integrating the processor and the memory on the same chip of one body. However, general use processors are usually different in the manufacturing process and design from general-use large-capacity memories, which makes it considerably difficult to simply apply the existing technique to the processors and memories for the above purpose.

First, the manufacturing process will be explained. Although general memories use two layers of wirings at most, many steps are carried out to make each cell of the memory fine. On the other hand, a multi-layer wiring is often employed in the processor to improve a degree of integration.

Next, the concept of design will be explained. The memory is designed in such a layout as to optimize analog characteristics, e.g., a cell capacity and a wiring delay, and therefore changing the layout requires a lot of time and costs. FIG. 1 shows an example of the layout of a 16-Mbit DRAM. A common 16-Mbit DRAM has 4-Nbit cell regions arranged in the form of arrays. On the other hand, for the processor, particularly a control logic unit, a CAD tool (automatic arranging/wiring tool) is utilized which allows an automatic layout in a given region. In other words, the processor is allowed a high degree of freedom for changing the layout.

The following method may be proposed to integrate general-purpose processors and large-capacity memories in one chip under the aforementioned conditions. That is, a manufacturing process is based on that for the memory, while the conventional layout for the memory is also shared without being changed for the memory cell regions. The processor is made as small as possible so as to eliminate influences of degrading characteristics due to the fact that the manufacturing process is a memory basis. With the degree of freedom for changing the layout utilized, the processor is arranged in a gap in the memory.

For example, in "Proposal of New General-purpose Functional Part PPRAM toward 21st Century, by Mlurakami et al., Computer Architecture Research Report No. 108, 94-ARC-108, pp. 49–56, The Information Processing Society, Research Report Vol. 94, No. 91, ISSN 0919-6072", there is proposed a PPRAM (Parallel Processing Random Access Memory, Practical Parallel Random Access Machine) in which four general purpose processors 11 are arranged in parallel on one side of the chip, and arranged in the remaining region are a plurality of memory cell regions 12a of a general-purpose memory 12 in the form of arrays.

In the layout shown in FIG. 2, the memory cell regions 12a are located at different distances from the general-purpose processors 11 depending on their positions. The longer the distance, the longer the bus is, with the result that a delay in data transmission is increased. The difference in length of buses causes a difference in the data transmission time, necessitating an adaption in data transmitted from faster to slower. Further, when the length of the bus is lengthy, an area on the layout required for the bus is larger.

Also, in the Japanese Patent Application Laid-Open No. 5-94366(1993), there is disclosed a microcomputer in which a CPU 14 is installed in a gap between two memory spaces 13, and arranged at one side in parallel to the row of the CPU 14 and memory spaces 13 are an address bus 15 and a data bus 16 as shown in FIG. 3.

In this microcomputer, the address bus 15 and the data bus 16 provided at one side of the row of the memory spaces 13 and the CPU 14 are required to be the same length as the row, and therefore the length is undesirably elongated if the memory spaces 13 are large.

Further, in the Japanese Patent Application Laid-Open No. 63-81569(1988), there is disclosed a microcomputer in which a plurality of modules 31, 32 and 33 having respective functions as memories and peripheral circuits, and a CPU 34 are set in a manner to be generally of the same width, with a bus 35 arranged at one side in parallel with the row of the modules 31, 32 and 33 and the CPU 34, as shown in FIG. 4. In the disclosed microcomputer, when the modules 31, 32, and the CPU 34 are arranged in two rows, the bus 35 is provided between the rows (FIG. 5). If the modules 31, 32, . . . and the CPU 34 each having a different width are used, the bus 35 is disposed in the perimeter of the modules, that is, in the periphery of the chip (FIG. 6). In any of FIGS. 5 and 6, the CPU 34 is located generally at the center of the modules 31, 32, . . . In addition, the modules 31, 32 . . . , and the CPU 34 face straight to the bus 35.

In this art, however, the same problem as discussed above remains. That is, when the bus 3D is arranged in parallel with the row of the modules 31, 32, 33 and the CPU 34, and when the bus 35 is arranged in the perimeter of the modules 31, 32. . . and the CPU 34, namely, in the periphery of the chip, the larger module elongates the bus.

Also, in the configuration in which the bus (15, 16 or 35) is provided at the lateral side of the memory spaces 13 (or the modules 31, 32, . . .) and the CPU 14 (or 34), such a disadvantage arises in to that the area required for forming the bus is increased in proportion to a count of bits.

FIG. 7 is a schematic plan view showing a connecting part between a processor and a memory in a conventional microcomputer. Buses $B_a$, $B_b$, and $B_c$ connects a CPU 3 and a memory cell region 2 as shown in FIG. 7. In general, the buses $B_a$, $B_b$, and $B_c$ have the same width. This structure where the buses for connecting the processor and the memory have the same width is usually employed both when the CPU and the memory cell regions are integrated in one chip and when the CPU and the memory cell regions are provided on separate chips.

However, when an operation speed in the memory cell region 2 is lower than that in the CPU 3, the operation speed in the CPU 3 is matched to the operation speed in the memory cell region 2. Consequently, the CPU 3 does not fully exert its processing efficiency at present.

Still further, in the Japanese Patent Application Laid-Open No. 2-87283 (1990), there is disclosed a semiconductor integrated circuit device including a serial/parallel converter for converting a bus connection between a CPU and a peripheral circuit to a serial connection, and a clock multiplying circuit, whereby a count of bus wirings is decreased.

Still further, in the Japanese Patent Application Laid-Open No. 7-153257 (1995), there is disclosed a semiconductor memory comprising a DRAM and an SRAM mounted on the same chip, wherein the DRAM is accessed from outside via the SRAM.

SUMMARY OF THE INVENTION

The present invention is devised to solve the problems discussed above and it is one object of the invention to provide a microcomputer in which a processor bus is designed to have a smaller width than that of a memory bus, thereby enabling a processor to provide the processing efficiency to the utmost in a compact size.

In a microcomputer according to the invention, a processor bus has a smaller width than that of a memory bus, and a selector in a buffer changes the bus width. Hence, it becomes needless to decrease the processing performance of the processor, thereby improving the processing performance of the microcomputer, and decreasing a layout area for bus wirings.

When the buffer includes a latch means for latching a signal, high-speed reading/writing of signals to a memory is realized.

When the buffer includes a data buffer for data signals and an instruction buffer for instruction signals, and these buffers are connected to the processor independently of each other, the processor can access the data buffer and the instruction buffer simultaneously. This enhances the processing efficiency.

The microcomputer further comprises a bus interface unit which includes a selector for changing the bus width, which receives signals from outside (i.e., externally) and outputs signals outside, and an external bus for connecting the bus interface unit with the outside, wherein the memory bus connects the bus interface unit with the memory, and the external bus has a smaller width than that of the memory bus. In this case, inputting signals from outside and outputting signals outside can be performed at a high speed because of the bus interface unit. Also, since the width of the external bus is smaller than that of the memory bus, a count of pads is reduced in comparison with the prior art. As a result, an area required for the pads is decreased, and the microcomputer becomes compact in size. Further, since a count of pins is decreased as well, the power consumption is suppressed.

When the bus interface unit includes a latch means for latching signals, inputting and outputting of signals is done at a high speed.

In the above-mentioned microcomputer, when the memory includes a high-speed memory operating at a high speed and a low-speed memory operating at a low speed, processing is efficiently performed as a transmission speed is changed in accordance with the kind of signals.

In the microcomputer, when the memory includes a large-capacity memory and a small-capacity memory, processing is efficiently carried out as the memories are switched in accordance with the kind of signals.

It is another object of the invention to provide a microcomputer in which a processor, a memory and a peripheral circuit are so arranged as to shorten a bus length, thereby improving a processing efficiency and decreasing a size.

In a microcomputer according to the invention, the memory includes a plurality of memory cell regions, and the processor is arranged in a space of the memory cell regions, so that distances (bus length) between the processor and the memory cell regions can be shortened and the processor can be substantially situated at the same distance from the memory cell regions.

The memory is arranged in a plurality of rows of memory cell regions, and the processor is disposed in the space of the rows. Accordingly, it becomes easy to separate the bus to a plurality of branches and connect separately to the processor. Hence, the memory cell regions connected to the buses of different branches can be controlled and accessed independently. Also, separating the bus to a plurality of branches shortens the length of each bus. Since it is enough to space the rows of memory cell regions each consisting of a plurality of memory cell regions, the existing layout can be utilized for the memory, to which the processor is matched.

Owing to the configuration that the processor is set in the space of rows of memory cell regions, circuits of a buffer including a data buffer and an instruction buffer, a bus interface unit, etc. can be arranged in the remaining space.

When the buffer or the bus interface unit is disposed close to the memory or the memory cell region, it is unnecessary to bend the memory bus having a large width, thereby avoiding an increase of the layout area for the bus wiring.

In four or more memory cell regions are provided, with the buffer set adjacent to an inner short side of each memory cell region, and the processor bus is drawn out from one side of the processor, input/output terminals of the processor can be totally set at one side of the chip.

When the memory cell regions are not smaller than four, the buffer is arranged close to the inner short side of each memory cell region, and the processor bus is led from two sides of the processor, the bus length can be smaller than in the foregoing structure.

If the memory cell regions are not smaller than four, the buffer is arranged close to an inner long side of each memory cell region, and the processor bus is led out from one side of the processor, the layout is effective for a case where the memory capacity is large and the width of the memory bus is large.

The above and further objects and features of the invention will more fully be apparent from the following detailed description with accompanying drawings.

DESCRIPTION OF THE PREFERRED EMBODIMENTS

With reference to the drawings, various examples embodying the present invention will be described hereinafter.

[Embodiment 1]

Figure 1:
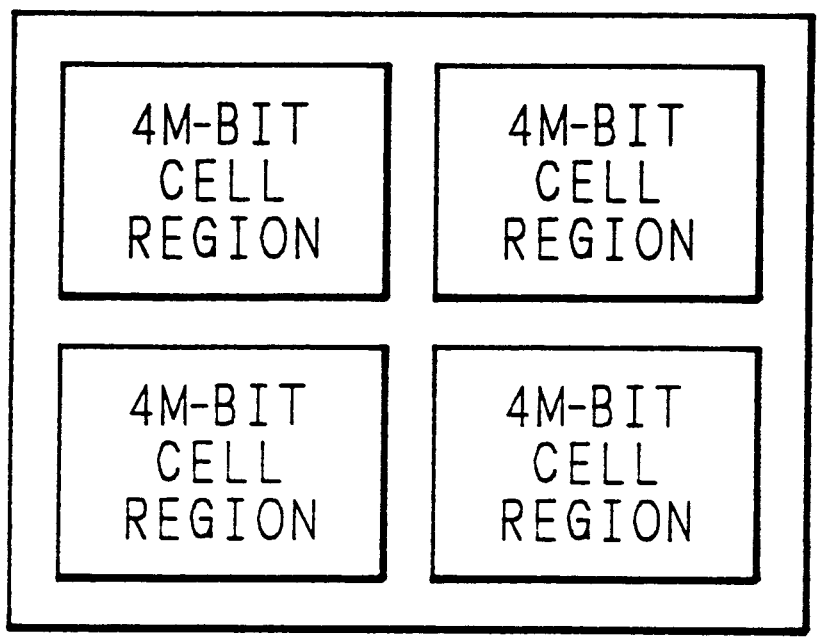
FIG. 1 shows an example of a layout of a conventional 16-Mbit DRAM.
Figure 2:
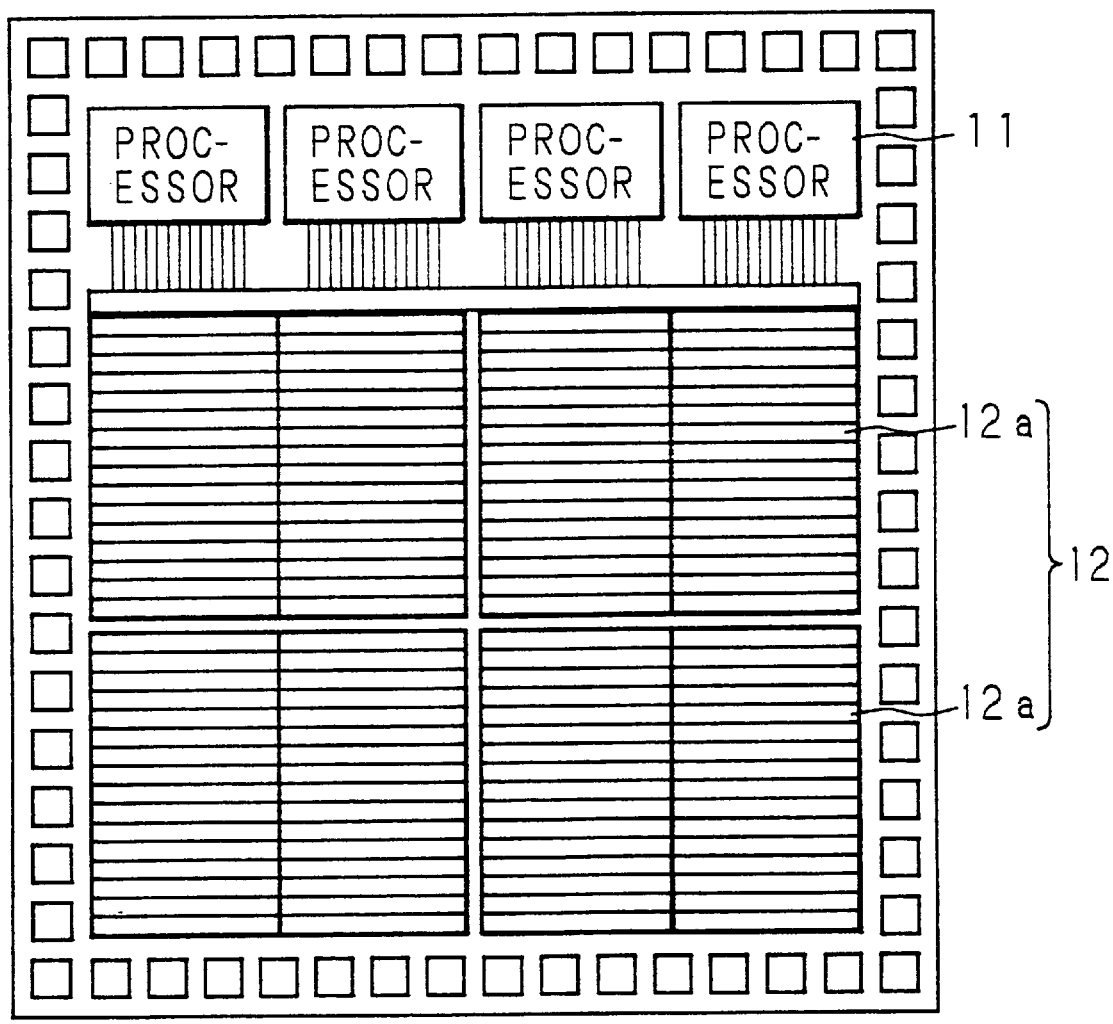
FIG. 2 is a schematic plan view showing a conventional microcomputer.
Figure 3:
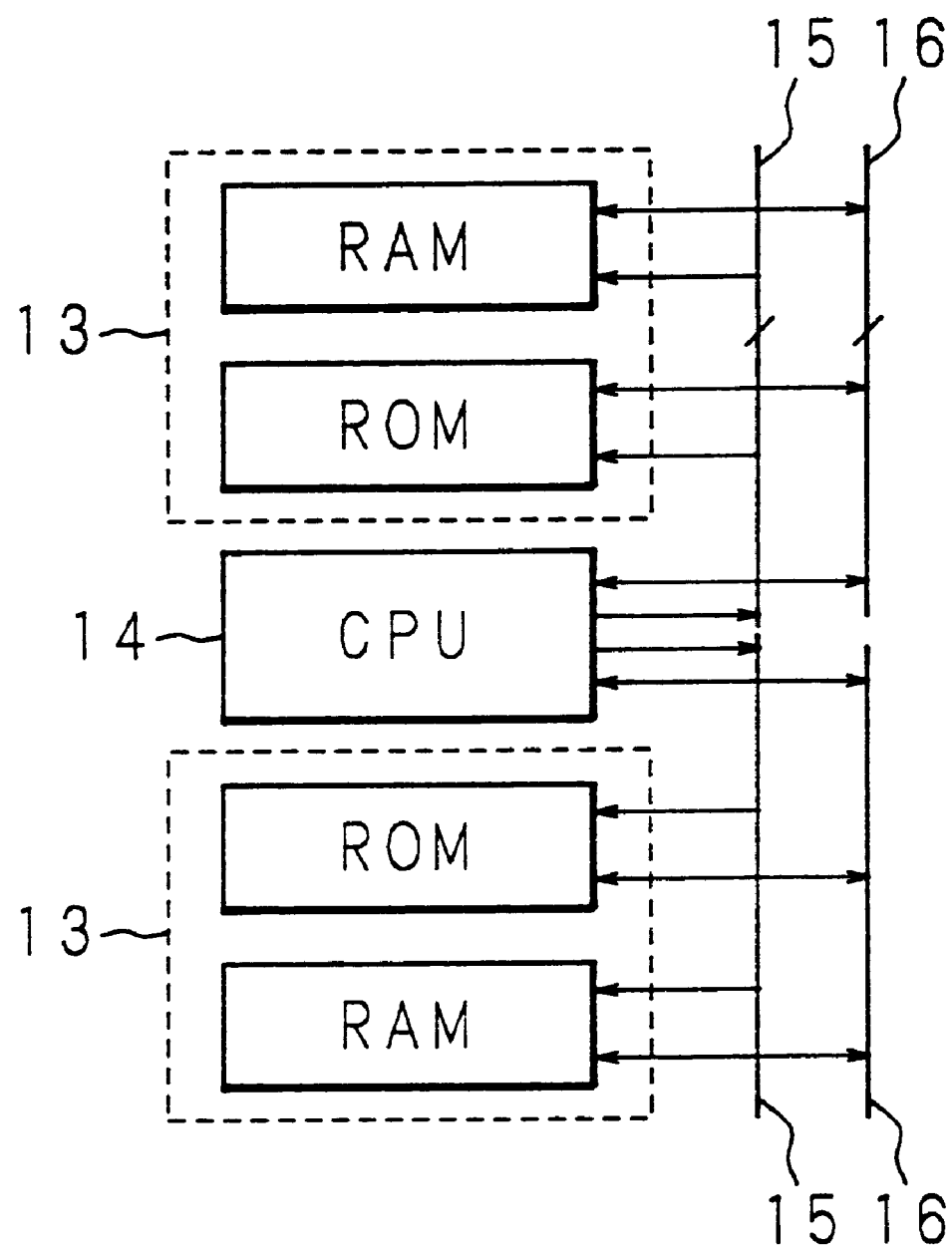
FIG. 3 is a schematic plan view showing a conventional microcomputer.
Figure 4:
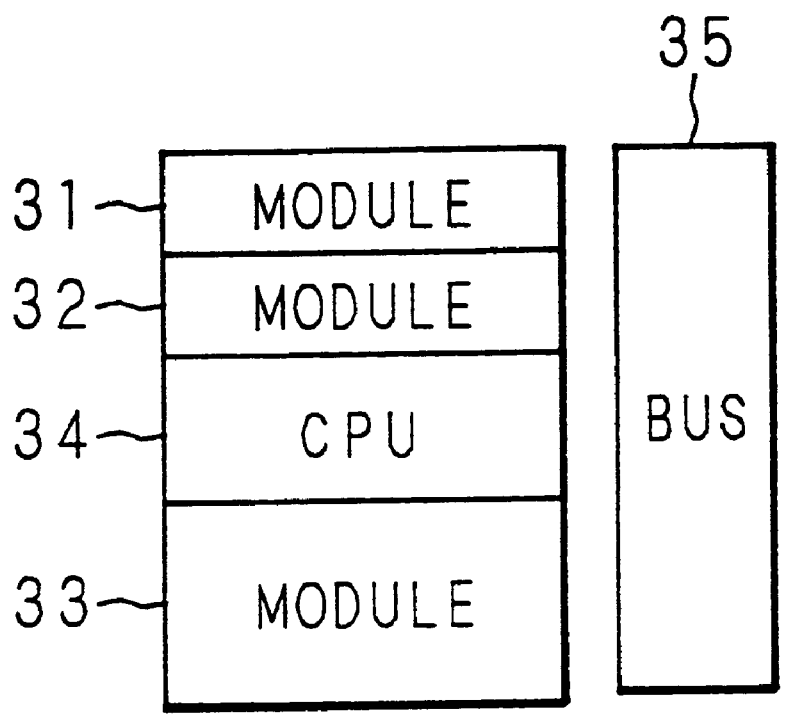
FIG. 4 is a schematic plan view showing a conventional microcomputer.
Figure 5:
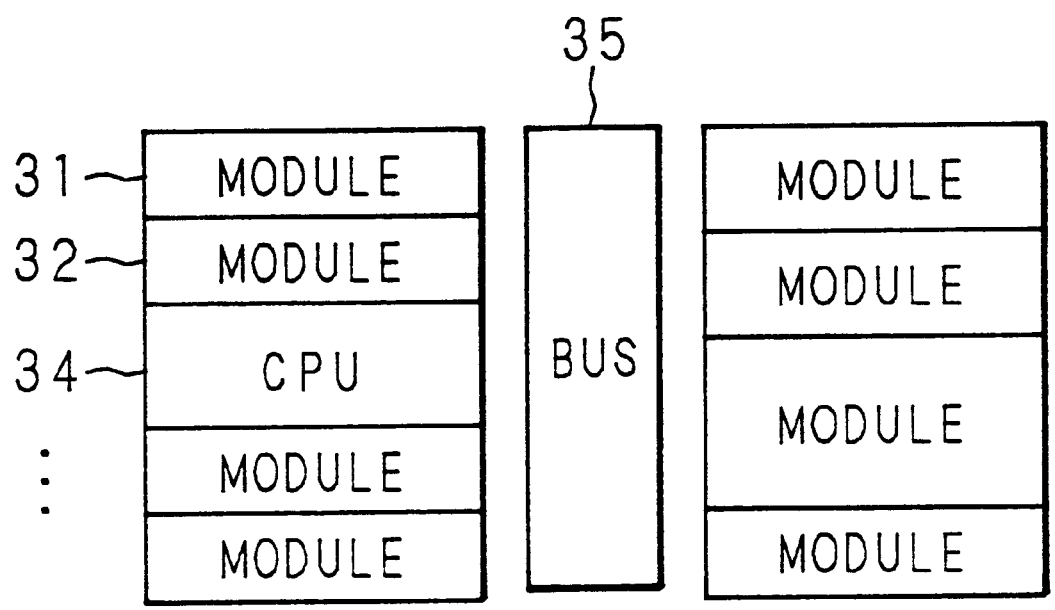
FIG. 5 is a schematic plan view showing a conventional microcomputer.
Figure 6:
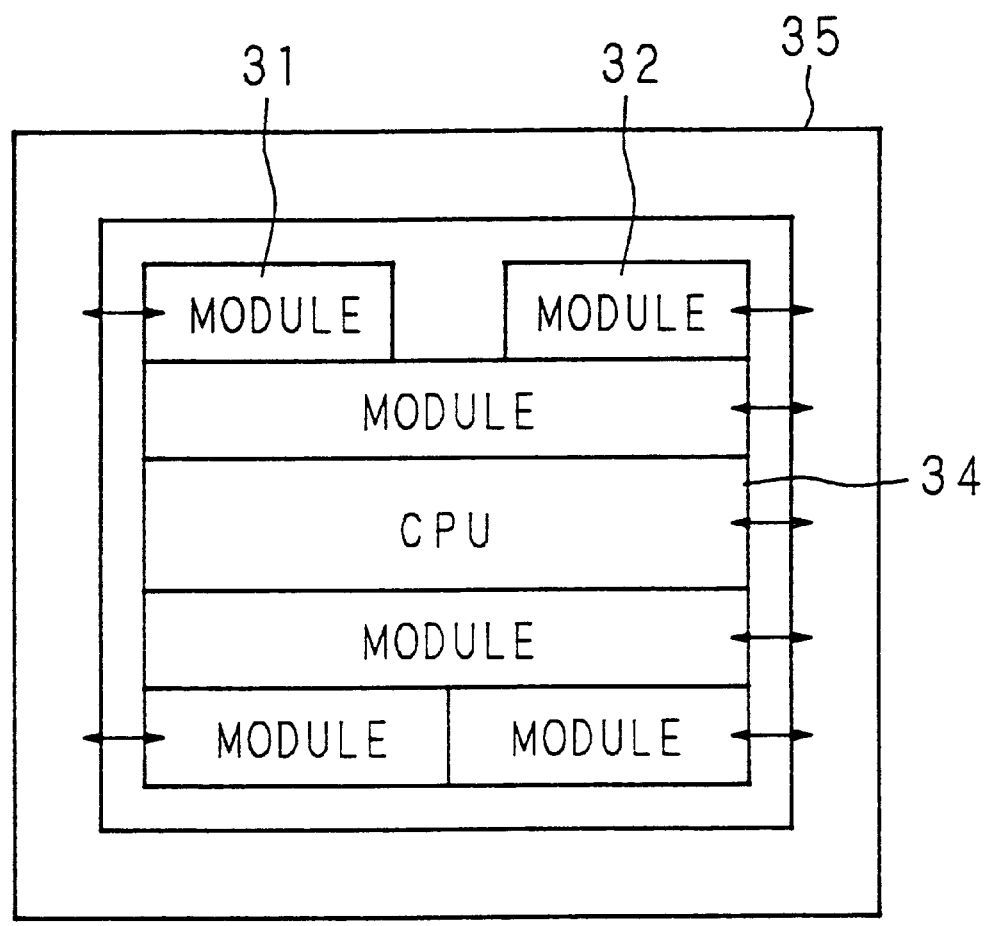
FIG. 6 is a schematic plan view showing a conventional microcomputer.
Figure 7:
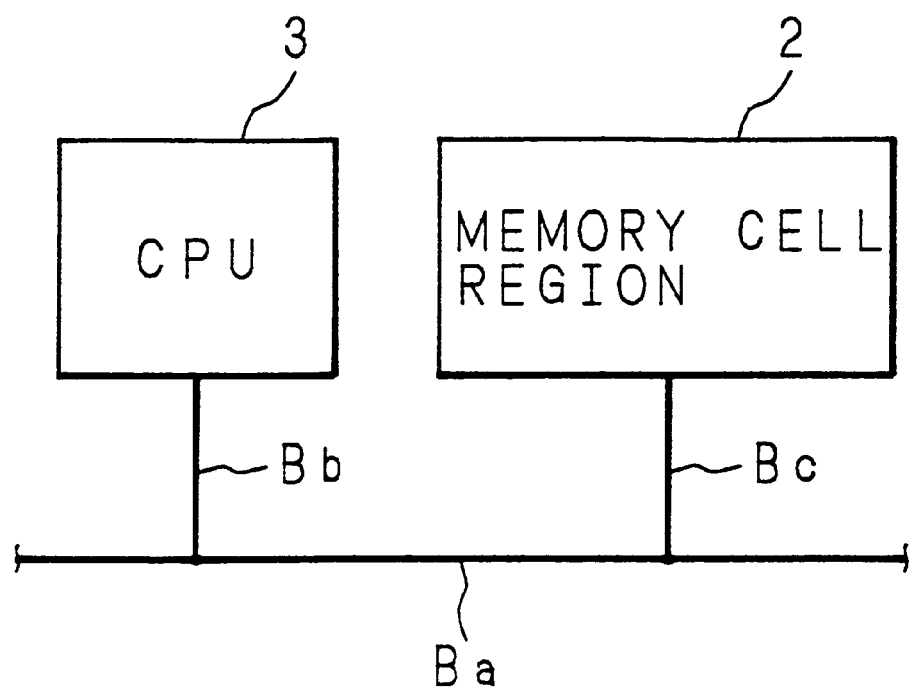
FIG. 7 is a schematic plan view showing a connecting part between a processor and a memory in a conventional microcomputer.
Figure 8:
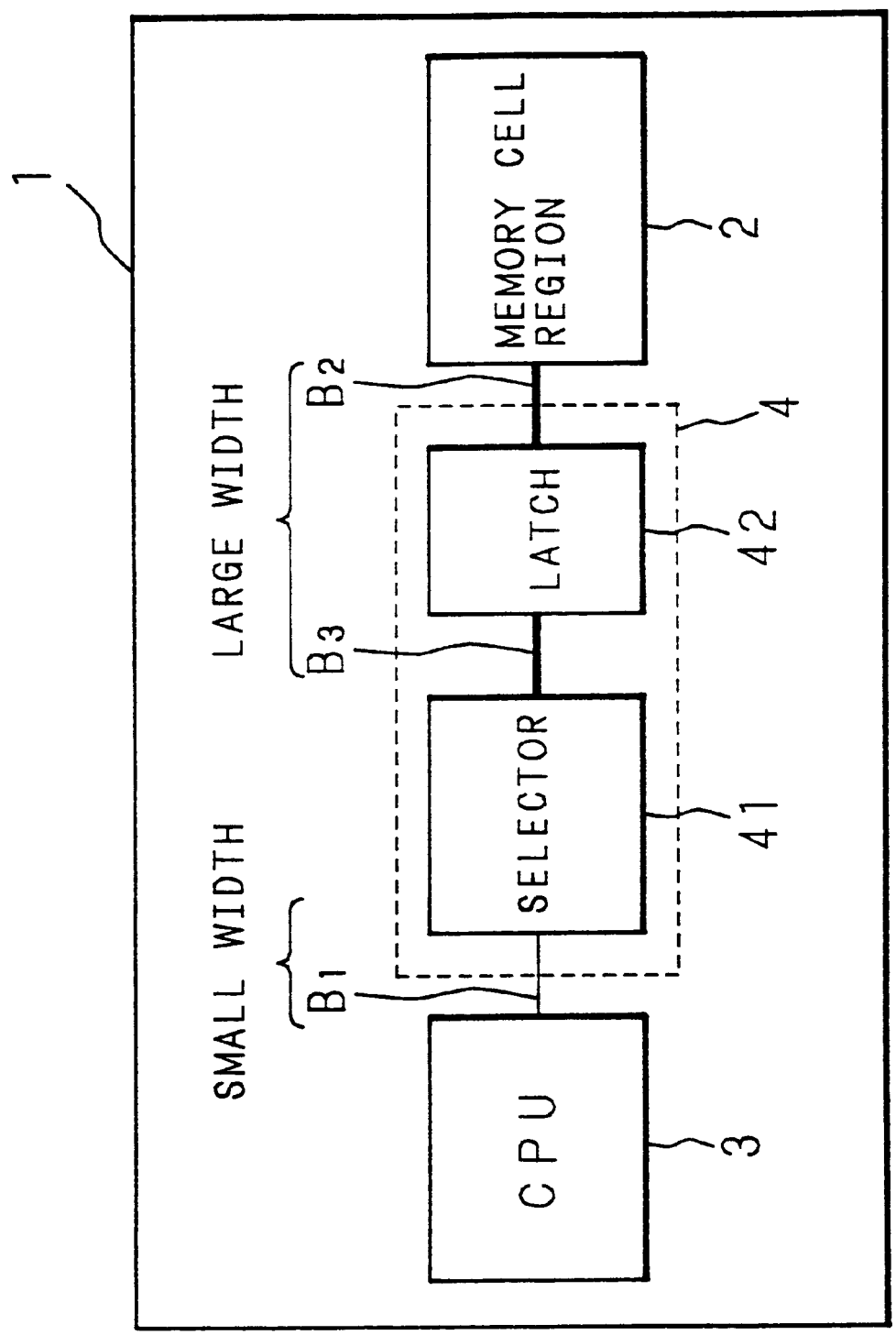
FIG. 8 is a schematic plan view showing a main portion in a microcomputer according to a first embodiment.

FIG. 8 is a schematic plan view showing a main portion of a microcomputer according to a first embodiment of the invention. In the figure, numeral 1 indicates an outer frame of a chip, and a memory cell region 2 and a CPU 3 are integrated on the chip 1. A buffer 4 is arranged between the memory cell region 2 and the CPU 3. A processor bus $B_1$ having a small width (for example, 32 bits) connects the CPU 3 and the buffer 4, and a memory bus $B_2$ having a large width (for example, 128 bits) connects the buffer 4 and the memory cell region 2. The buffer includes a selector 41 and a latch (or register) 42, and a buffer bus $B_3$ having the same width (for example, 128 bits) as that of the memory bus $B_2$ connects the selector 41 and the latch 42.

When data or an instruction queue (IQ) is to be read from the memory cell region 2, the latch 42 temporarily holds the data or instruction queue and sends the same to the selector 41. The selector 41 decreases the bus width on the basis of a control signal and supplies the data or instruction queue to the CPU 3. When data from the CPU 3 is to be written into the memory cell region 2, the selector 41 increases the bus width in accordance with a control signal and feeds the data to the latch 42. The latch 42 temporarily latches the data and sends the same to the memory cell region 2. The control signals are given by a memory controller or the CPU 3.

Since the microcomputer is equipped with the selector 41 for changing the bus width, signals can be transmitted even when the bus widths are different from each other. Hence, it is not necessary to lower the processing efficiency of the CPU 3. The processor bus $B_1$ between the CPU 3 and the buffer 4 has the small width, so that a layout area for the bus is reduced.

[Embodiment 2]

Figure 9:
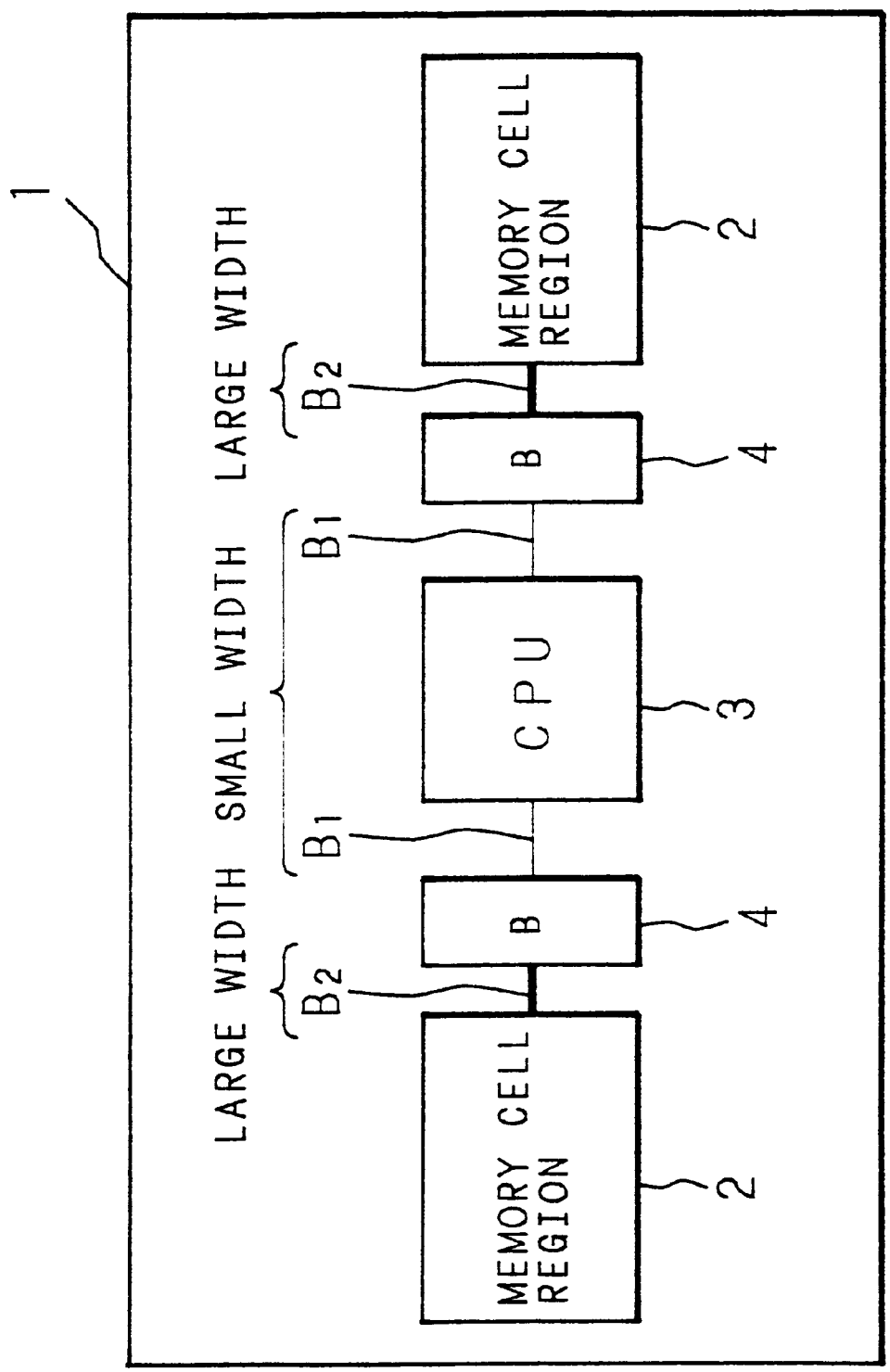
FIG. 9 is a schematic plan view showing a main portion in a microcomputer according to a second embodiment.

FIG. 9 is a schematic plan view showing a main portion of a microcomputer according to a second embodiment. In the figure, numeral 1 shows an outer frame of a chip, and two memory cell regions 2 and a CPU 3 are integrated on the chip 1. Buffers (B) 4 are arranged between the respective memory cell regions 2 and the CPU 3 in a manner to be closer to the memory cell regions 2. A processor bus $B_1$ having a small width (for example, 32 bits) connects the CPU 3 and the buffer 4, and a memory bus $B_2$ having a large width (for example, 128 bits) connects the buffer 4 and the memory cell region 2. The buffer 4 is constructed in the same structure as in the first embodiment. Although there are two memory cell regions 2 in FIG. 9, the microcomputer may have two or more memory cell regions.

In the second embodiment, since each buffer 4 is arranged closer to the memory cell region 2, it is advantageous in that it is needless to bend the memory bus $B_2$ having the large bus width, in addition to the effect of the first embodiment. An increment of the layout area for the bus wiring can be avoided. This structure is more effective in a case where there are a plurality of memory cell regions.

[Embodiment 3]

Figure 10:
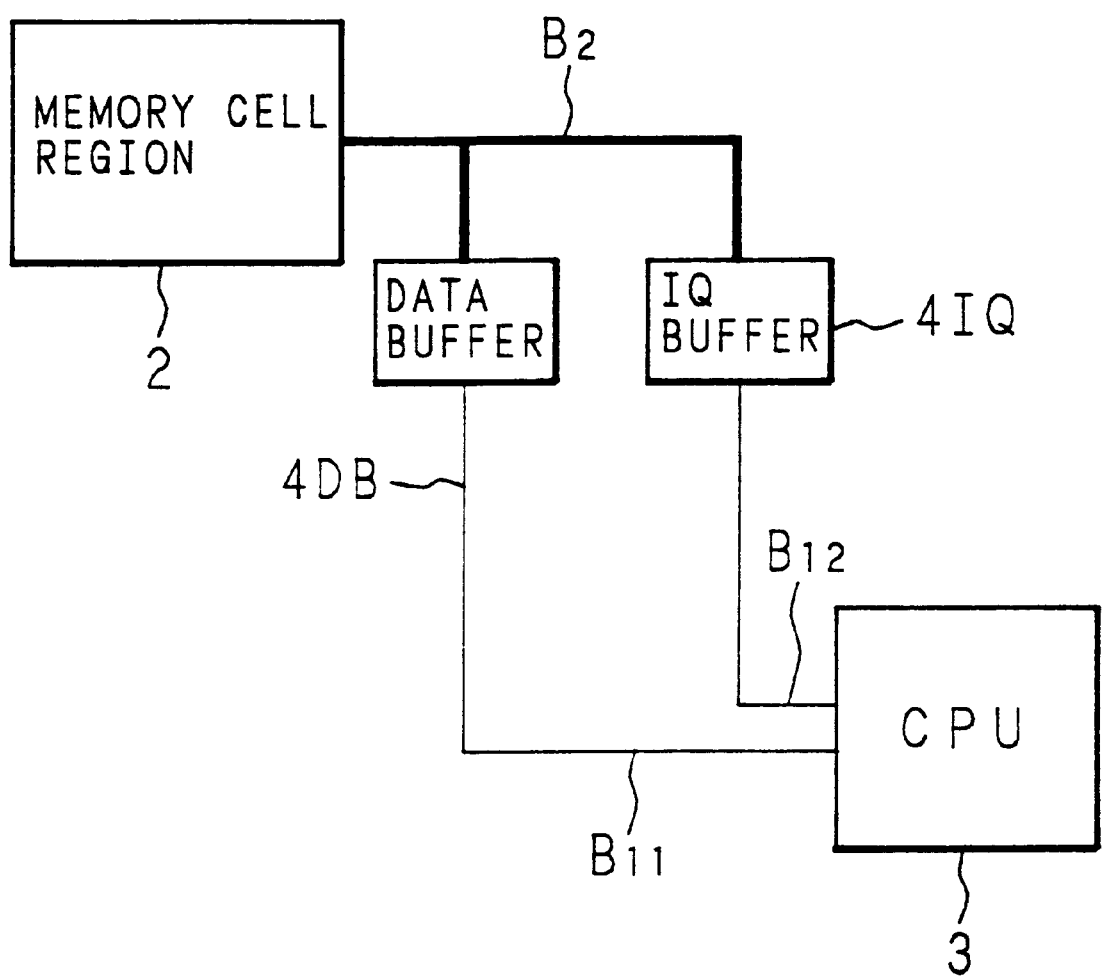
FIG. 10 is a schematic plan view showing a main portion in a microcomputer according to a third embodiment.

FIG. 10 is a schematic plan view showing a main portion of a microcomputer according to a third embodiment. An outer frame of a chip is omitted in the figure. A data buffer 4DB and an instruction buffer (IQ buffer) 4IQ are arranged between a memory cell region 2 and a CPU 3. A data processor bus $B_{11}$ having a small width (for example, 32 bits) connects the CPU 3 and the data buffer 4DB, and an instruction processor bus $B_{12}$ having a small width (for example, 32 bits) connects the CPU 3 and the instruction buffer 4IQ. A memory bus $B_2$ having a large width (for example, 128 bits) connects the data buffer 4DB, the instruction buffer 4IQ and the memory cell region 2. Each of the data buffer 4DB and the instruction buffer 4IQ includes a selector and a latch, similar to the structure shown in FIG. 8. The microcomputer may have a plurality of memory cell regions, and the data buffer 4DB and the instruction buffer 4IQ may be connected to every memory cell region.

In the third embodiment, the data and instruction queue can be accessed independently and moreover simultaneously when needed. The third embodiment is meritorious, in addition to the effect of the first embodiment, in that the CPU 3 processes data at a further higher speed.

[Embodiment 4]

Figure 11:
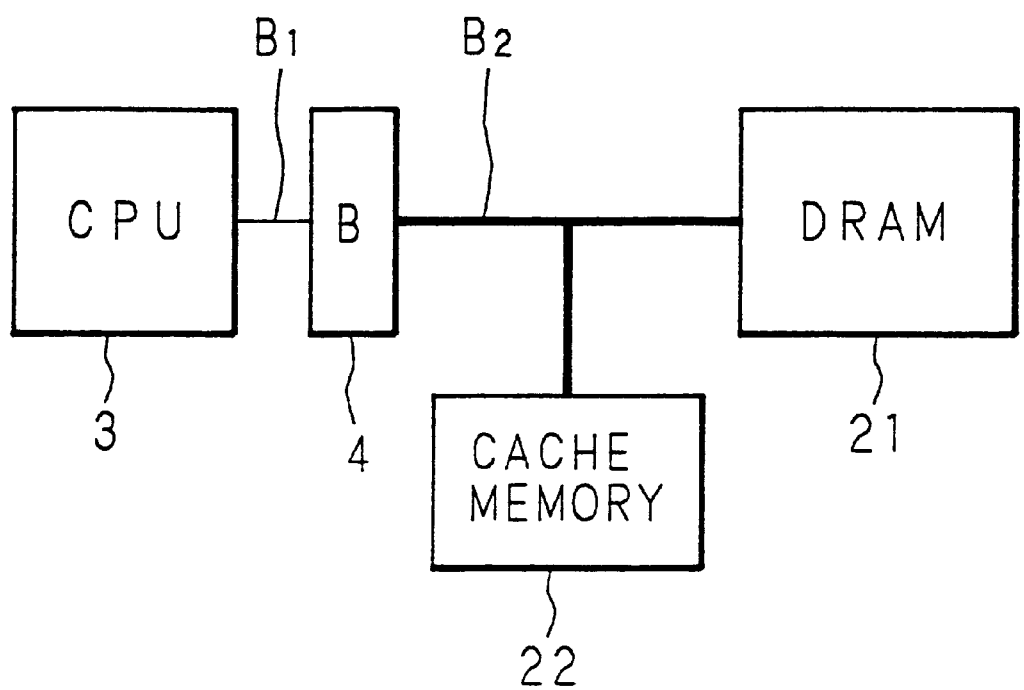
FIG. 11 is a schematic plan view showing a main portion in a microcomputer according to a fourth embodiment.

FIG. 11 is a schematic plan view showing a main portion of a microcomputer according to a fourth embodiment. An outer frame of a chip is omitted in the figure. This embodiment represents a case where the memory cell region 2 in the constitution of FIG. 8 includes a DRAM 21 and a cache memory 22 as a high-speed memory. A processor bus $B_1$ having a small width (for example, 32 bits) connects a CPU 3 and a buffer 4, and a memory bus $B_2$ having a large width (e.g., 128 bits) connects the buffer 4, the DRAM 21 and the cache memory 22. The buffer 4 includes a selector and a latch, similar to FIG. 8. The buffer 4 may have the data buffer 4DB and the instruction buffer 4IQ as in FIG. 10.

In the fourth embodiment, since the cache memory 22 is connected to the memory bus $B_2$, an access to the memory is achieved at a high speed, thus improving the processing efficiency further, not to mention the effect attained in the first embodiment.

[Embodiment 5]

Figure 12:
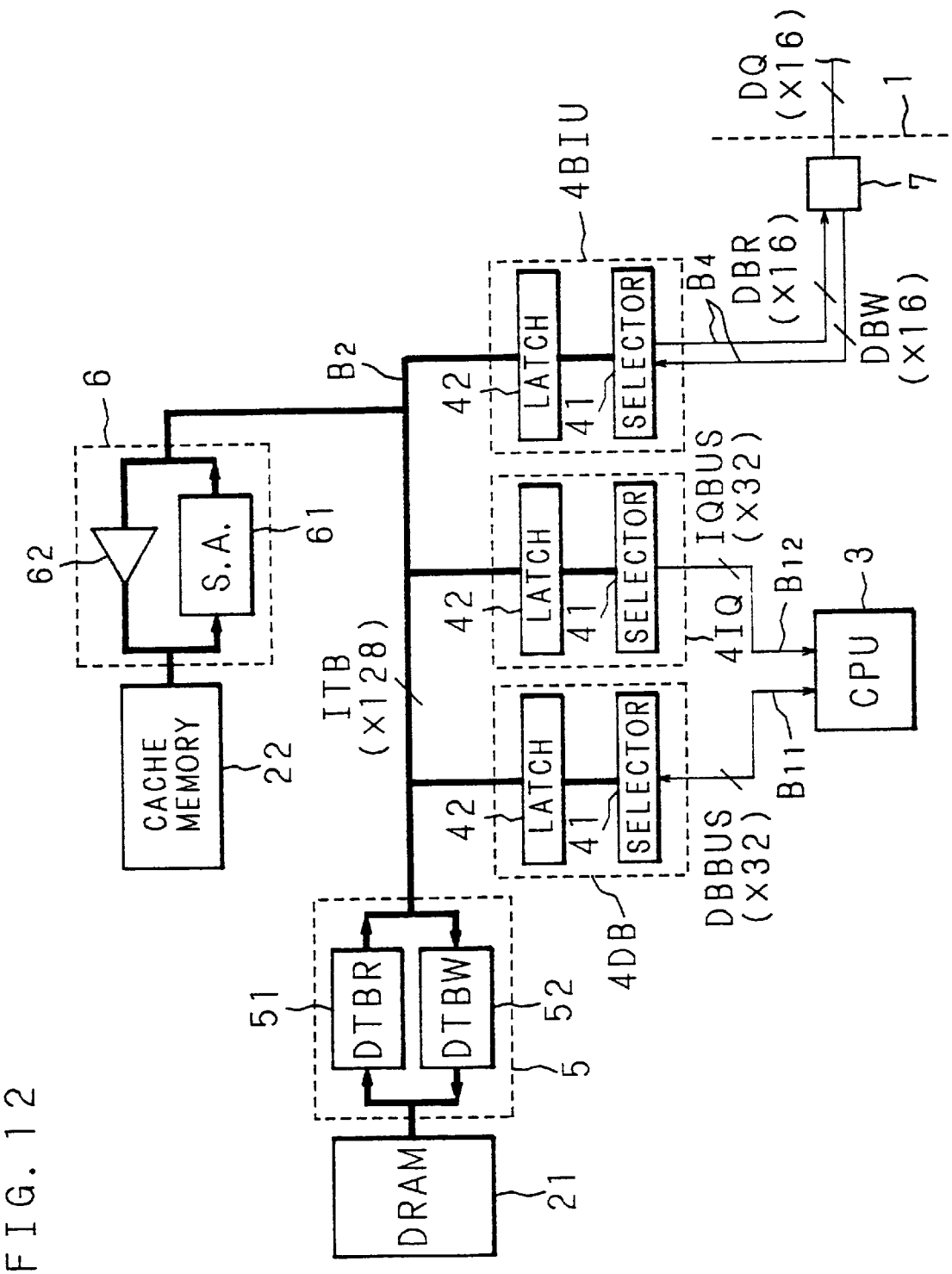
FIG. 12 is a schematic plan view showing a main portion in a microcomputer according to a fifth embodiment.

FIG. 12 is a schematic plan view showing a main portion of a microcomputer according to a fifth embodiment. An outer frame of a chip is omitted in the figure. In this embodiment, the configurations shown in FIGS. 10 and 11 are combined, and a bus interface unit 4BIU which is a buffer for inputting/outputting signals to the outside of the chip is connected to a memory bus $B_2$. Each of a data buffer 4DB, an instruction buffer 4IQ and the bus interface unit 4BIU includes a selector 41 and a latch 42. The selector 41 of the bus interface unit 4BIU is connected to a pad 7 disposed in the periphery of the chip via an external bus $B_4$ having, for instance, 16 bits. A data processor bus $B_{11}$ and an instruction processor bus $B_{12}$ are of 32 bits, and the memory bus $B_2$ has 128 bits.

A latch circuit 5 is disposed at an input/output unit for stored signals of a DRAM 21. The latch circuit 5 is composed of a data transmission buffer DTBR which is a latch circuit exclusive for reading and a data transmission buffer DTBW which is a latch circuit exclusive for writing. A cache access circuit 6 is disposed at an input/output unit for stored signals of a cache memory 22. The cache access circuit 6 is composed of a sense amplifier (S.A.) 61 for amplifying a signal at a read time and a driver 62 for driving the cache memory 22 at a write time.

In the fifth embodiment, since it is not required to make a count of pads to be connected to the bus interface unit 4BIU agree with a count of bits of the memory, the layout area for pads is decreased. Also, a count of pins for the connection with the outside of the chip is reduced, thereby saving the power consumption.

Figure 13:
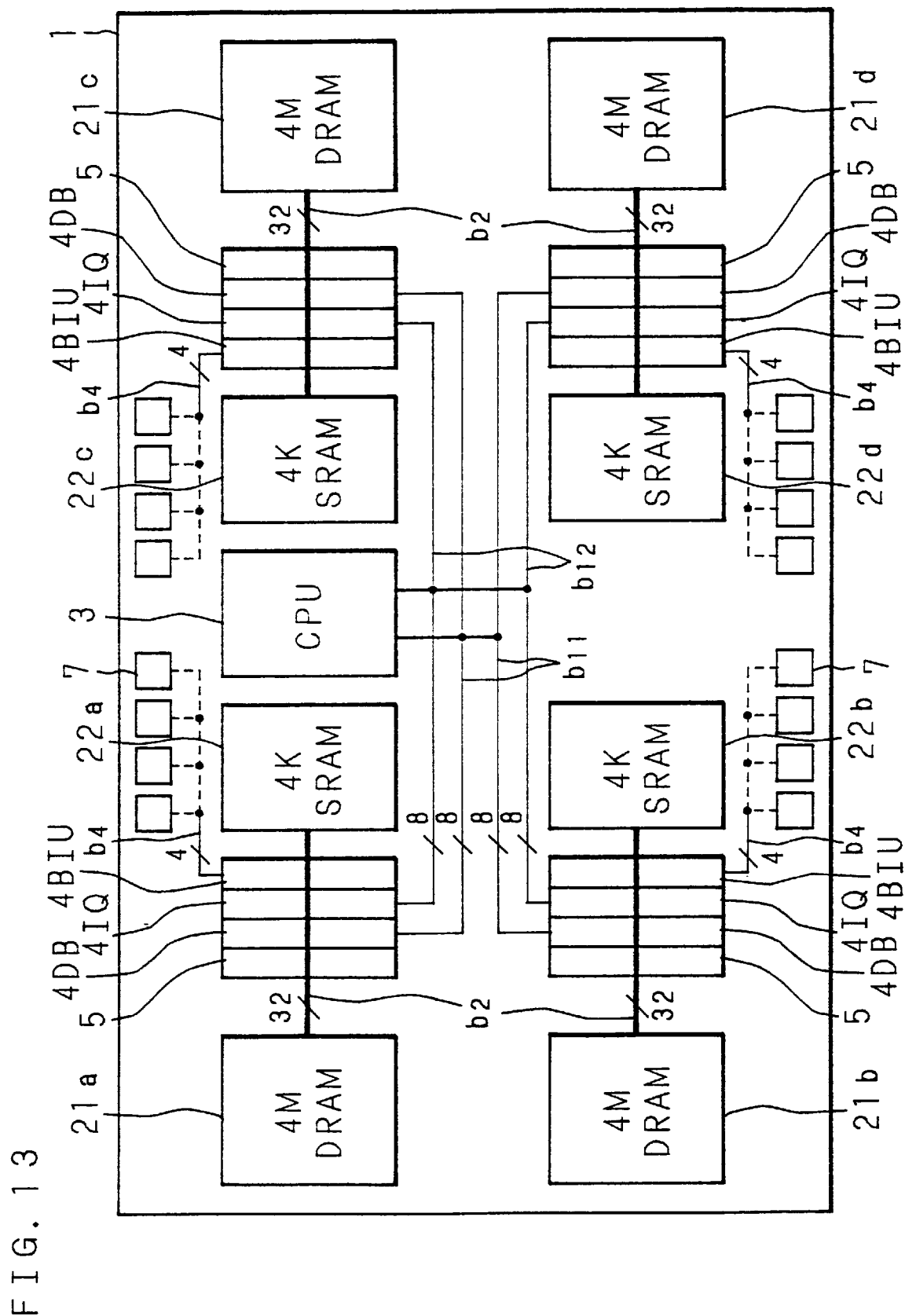
FIG. 13 is a layout diagram of the whole chip in the constitution of the fifth embodiment.

FIG. 13 is a layout diagram when the DRAM (16M-DRAM) 21 shown in FIG. 12 is divided to four regions, and integrally mounted on one chip. Four 4M-DRAMs 21a, 21b, 21c and 21d are arranged at four corners of a rectangular chip 1. At the same time, the cache memory (16K-SRAM) 22 is also divided to four regions. The latch circuit 5, the data buffer 4DB, the instruction buffer 4IQ, the bus interface unit 4BIU and 4K-SRAM 22a (22b, 22c, 22d) are disposed to approach an inner short side of the corresponding 4M-DRAM 21a (21b, 21c, 21d) in this order in a longitudinal direction of the chip 1. A CPU 3 is interposed between the 4K-SRAMs 22a and 22c in an upper portion of the chip 1.

A memory bus $b_2$ of 32 bits connects the 4M-DRAM 21a (21b, 21c, 21d), the data buffer 4DB, the instruction buffer 4IQ, the bus interface unit 4BIU and the 4K-SRAM 22a (22b, 22c, 22d). A data processor bus $b_{11}$ of 8 bits connects the data buffer 4DB and the CPU 3, and an instruction processor bus $b_{12}$ of 8 bits connects the instruction buffer 4IQ and the CPU 3. An external bus $b_4$ for connecting the bus interface unit 4BIU and the pads 7 is 4 bits.

Now, a circuit structure of the data buffer 4DB, the instruction buffer 4IQ and the bus interface unit 4BIU shown in FIG. 13 will be depicted hereinafter.

Figure 14A:
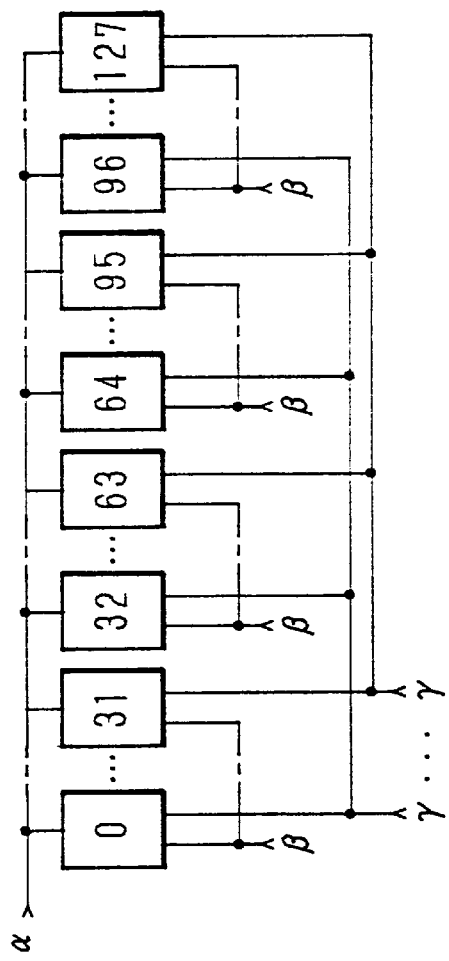
FIG. 14A is a diagram of routes for control signals from a CPU or a memory controller to a data buffer and an instruction buffer.

Bus routes for control signals from the CPU 3 or a memory controller when a 128-bit DRAM is used will be explained first with reference to FIGS. 14A, and 14B. FIG.14A shows bus routes related to the data buffer 4DB and the instruction buffer 4IQ. The control signal such as a clock signal is supplied via a route $\alpha$ (one line) connected to all of 128 buffer circuits included in each buffer. The control signal for controlling opening/closing of a selecting element such as the selector is supplied via a route $\beta$ (four lines) connected to each of 4 sets of 32 buffer circuits obtained from the 128 buffer circuits. Routes $\gamma$ (32 lines) correspond to the processor bus $B_1$ (the data processor bus $B_{11}$ and the instruction processor bus $B_{12}$), and are connected to one buffer circuits of every set, i.e., 4 buffer circuits in total.

Figure 14B:
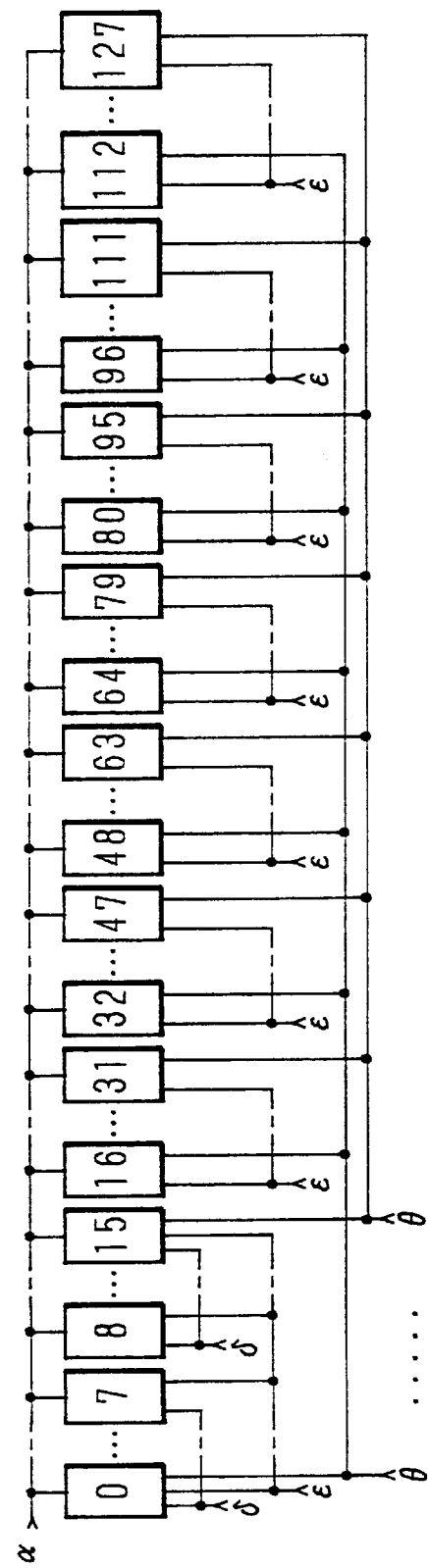
FIG. 14B is a diagram of routes for control signals from the CPU or the memory controller to a bus interface unit.

FIG. 14B shows bus routes related to the bus interface unit 4BIU. The control signal such as a clock signal is supplied via a route $\alpha$ (one line) connected to the whole 128 buffer circuits included in the bus interface unit 4BIU. The control signal for controlling opening/closing of a selecting element such as the selector is supplied via a route $\epsilon$ (8 lines) connected to each set comprising 16 buffer circuits as 128 buffer circuits are divided into 8 sets. A byte control signal is supplied via a route $\delta$ (16 lines) connected to each set of 8 buffer circuits when 128 buffer circuits are divided into 16 sets. Routes $\theta$ (16 lines) are external buses $B_4$, each of which is connected to one buffer circuit of each set, that is, the routes $\theta$ are connected to 8 buffer circuits in total.

Figure 15:
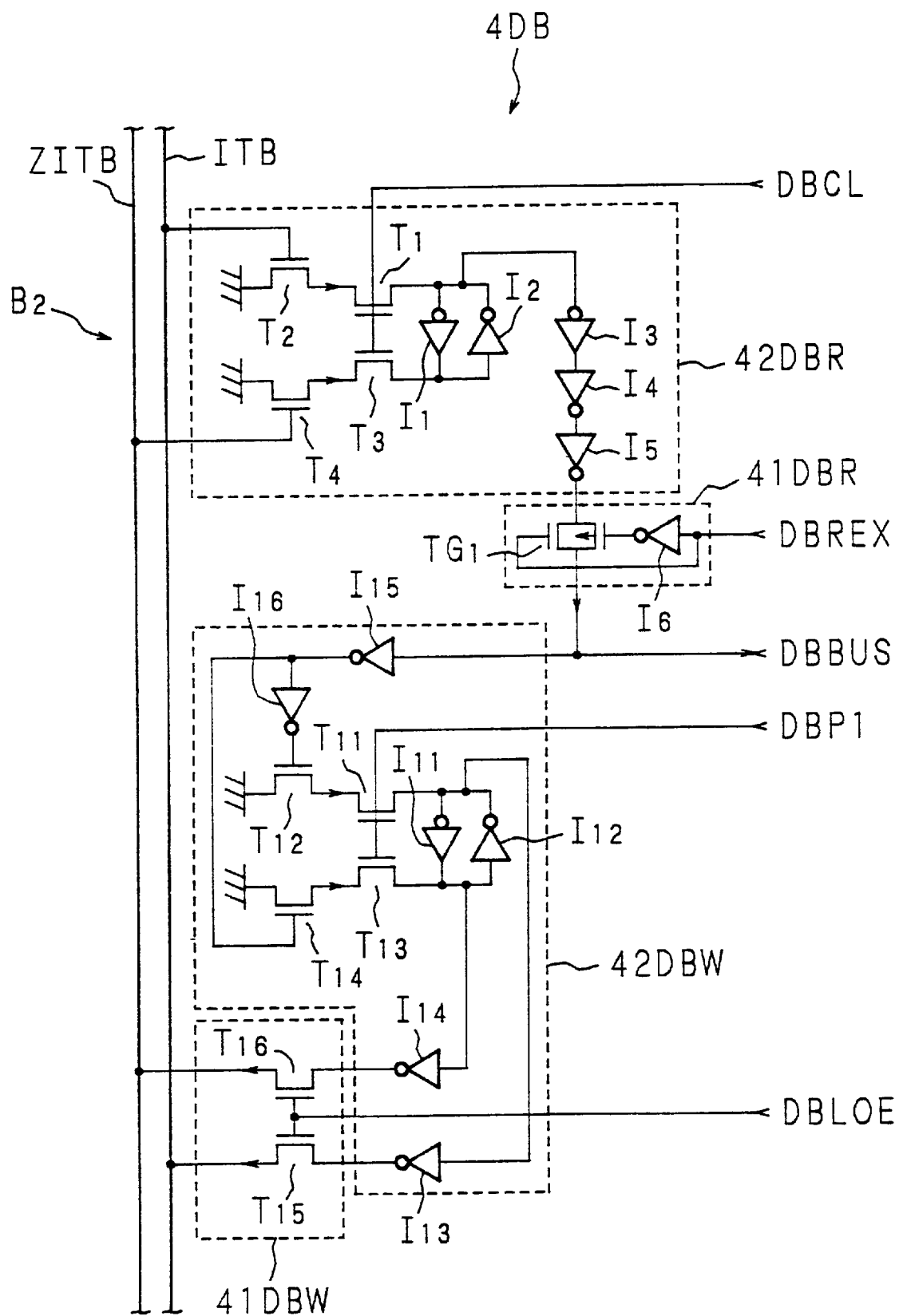
FIG. 15 is a circuit diagram of the data buffer.

FIG. 15 is a circuit diagram of the data buffer 4DB. The data buffer 4DB is composed of a reading latch circuit 42DBR, a reading selector 41DBR, a writing latch circuit 42DBW and a writing selector 4IDBW.

The reading latch circuit 42DBR is constructed as described hereinbelow. An input terminal of an inverter $I_1$ is connected to an output terminal of an inverter $I_2$. A connecting point of the terminals is grounded via N-ch (N-channel) transistors $T_1$ and $T_2$ and connected to a series circuit composed of inverters $I_3$, $I_4$ and $I_5$. An output terminal of the inverter $I_1$ is connected to an input terminal of the inverter $I_2$. A connecting point of the terminals is grounded via N-ch transistors $T_3$ and $T_4$.

A gate of the transistor $T_2$ is connected to an internal bus line ITB of the memory bus $B_2$, and a gate of the transistor $T_4$ is connected to an inverted internal bus line ZITB of the memory bus $B_2$. A data buffer reading clock DBCL for controlling a latching timing is applied to gates of the transistors $T_1$ and $T_3$ via the route $\alpha$.

An output terminal of the inverter $I_5$ is connected to a transfer gate $TG_1$ composed of an N-ch transistor and a P-ch (P-channel) transistor in the reading selector 41DBR. A data buffer reading control signal DBREX for controlling ON/OFF of the reading selector 41DBR is supplied to a gate of the N-ch transistor via the route β. The data buffer reading control signal DBREX is inverted by an inverter $I_6$ and then given to a gate of the P-ch transistor. An output terminal of the transfer gate $TG_1$ is connected to a data buffer bus line DBBUS (corresponding to the route γ) of the data processor bus $B_{11}$.

The writing latch circuit 42DBW is constructed as described hereinbelow. An input terminal of an inverter $I_{11}$ is connected to an output terminal of an inverter $I_{12}$. A connecting point of the terminals is grounded via N-ch transistors $T_{11}$ and $T_{12}$ and connected to an inverter $I_{13}$. An output terminal of the inverter $I_{11}$ is connected to an input terminal of the inverter $I_{12}$. A connecting point of the terminals is grounded via N-ch transistors $T_{13}$ and $T_{14}$, and connected to an inverter $I_{14}$.

A gate of the transistor $T_{12}$ is connected to the data buffer bus line DBBUS via inverters $I_{15}$ and $I_{16}$. A gate of the transistor $T_{14}$ is connected to the data buffer bus line DBBUS via the inverter $I_{15}$. A data buffer writing clock DBP1 for controlling a latching timing is applied to gates of the transistors $T_{11}$ and $T_{13}$ via the route γ.

An output terminal of the inverter $I_{13}$ is connected to the internal bus line ITB via an N-ch transistor $T_{15}$ in the writing selector 41DBW. An output terminal of the inverter $I_{14}$ is connected to the inverted internal bus line ZITB via an N-ch transistor $T_{16}$ in the writing selector 41DBW. A data buffer latch output enable signal DBLOE for controlling ON/OFF of the writing selector 41DBW is supplied to gates of the N-ch transistors $T_{15}$ and $T_{16}$ via the route β.

The operation in reading out data from the DRAM 21 or the cache memory 22 to the CPU 3 will be described. The transistor $T_2$ (or $T_4$) in the reading latch circuit 42DBR is turned ON by an H-level signal applied to the internal bus line ITB (or inverted internal bus line ZITB), and an L-level signal of a ground potential is applied to a latch circuit composed of inverters $I_1$ and $I_2$ at a timing when the data buffer reading clock DBCL is in H-level. The signal latched and outputted from the latch circuit is inverted by the inverters $I_3$, $I_4$ and $I_5$ and sent to the transfer gate $TG_1$ in the reading selector 41DBR. Here, when the data buffer reading control signal DBREX from the memory controller is in H-level, the transfer gate $TG_1$ is turned ON, and the data signal of H-level (or L-level) is supplied to the CPU 3 via the data buffer bus line DBBUS.

The operation in writing data into the DRAM 21 or the cache memory 22 from the CPU 3 will be described. A data signal of H-level (or L-level) supplied from the CPU 3 via the data buffer bus line DBBUS is inverted by the inverters $I_{15}$ and $I_{16}$ and then given to the gate of the transistor $T_{12}$. Also, the data signal is inverted by the inverter $I_{15}$ and then given to the gate of the transistor $T_{14}$. As a result, the transistor $T_{12}$ (or $T_{14}$) is turned ON, and an L-level signal of the ground potential is applied to a latch circuit composed of the inverters $I_{11}$ and $I_{12}$ at a timing when the data buffer writing clock DBP1 is in H-level. The latched signal is inverted by the inverters $I_{13}$ and $I_{14}$. Here, when the data buffer latch output enable signal DBLOE is in H-level, the transistors $T_{15}$ and $T_{16}$ in the writing selector 41DBW are turned ON, and the H-level signal is supplied to the internal bus line ITB (or inverted internal bus line ZITB).

Figure 16:
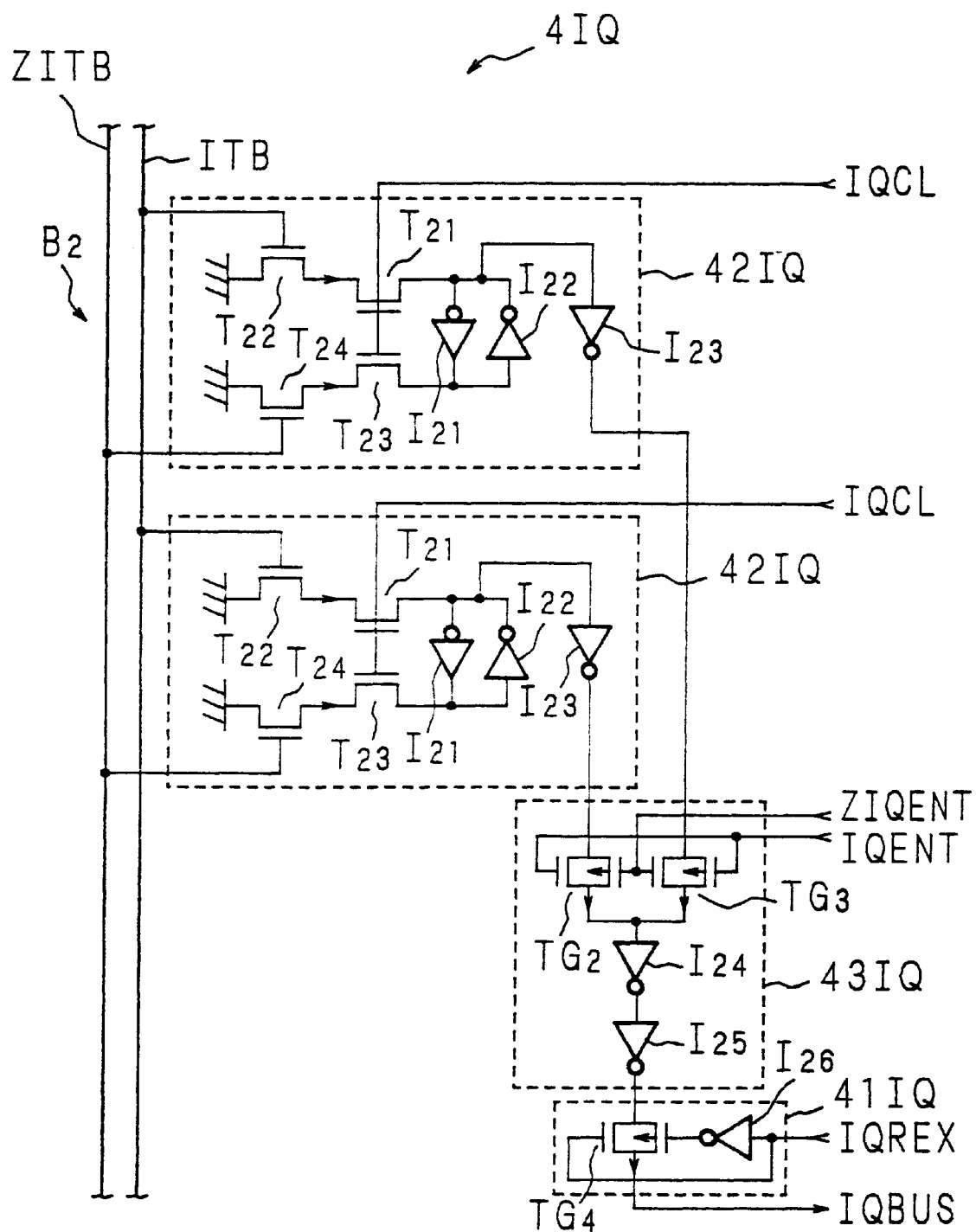
FIG. 16 is a circuit diagram of the instruction buffer.

FIG. 16 is a circuit diagram of the instruction buffer 4IQ. The instruction buffer 4IQ is composed of two reading latch circuits 42IQ, an entry selecting unit 43IQ and a reading selector 41IQ.

The reading latch circuit 42IQ is in a structure as described below. An input terminal of an inverter $I_{21}$ is connected to an output terminal of an inverter $I_{22}$. A connecting point of these terminals is grounded via N-ch transistors $T_{21}$ and $T_{22}$, and connected to an inverter $I_{23}$. An output terminal of the inverter $I_{21}$ is connected to an input terminal of the inverter $I_{22}$. A connecting point of the terminals is grounded via N-ch transistors $T_{23}$ and $T_{24}$.

A gate of the transistor $T_{22}$ is connected to the internal bus line ITB, and a gate of the transistor $T_{24}$ is connected to the inverted internal bus line ZITB. An instruction buffer reading clock IQCL for controlling a latching timing is applied to gates of the transistors $T_{21}$ and $T_{23}$ via the route α. The instruction buffer reading clocks IQCL in the two reading latch circuits 42IQ are independently controlled, e.g., by the memory controller.

The entry selecting unit 43IQ is composed of transfer gates $TG_2$ and $TG_3$ and inverters $I_{24}$ and $I_{25}$. An output terminal of the inverter $I_{23}$ in one reading latch circuit 42IQ is connected to the transfer gate $TG_2$ composed of an N-ch transistor and a P-ch transistor. An output terminal of the inverter $I_{23}$ in the other reading latch circuit 42IQ is connected to the transfer gate $TG_3$ composed of an N-ch transistor and a P-ch transistor. An instruction buffer entry selecting signal IQENT for selecting one of output signals from two reading latch circuits 42IQ is applied to a gate of the N-ch transistor in the transfer gate $TG_2$ and a gate of the P-ch transistor in the transfer gate $TG_3$ via the route α. Also, an inverted instruction buffer entry selecting signal ZIQENT is applied to a gate of the P-ch transistor in the transfer gate $TG_2$ and a gate of the N-ch transistor in the transfer gate $TG_3$ via the route α. Output terminals of the transfer gates $TG_2$ and $TG_3$ are connected to a series circuit composed of inverters $I_{24}$ and $I_{25}$.

The reading selector 41IQ includes a transfer gate $TG_4$ and an inverter $I_{26}$. An output terminal of the inverter $I_{25}$ is connected to the transfer gate $TG_4$ composed of an N-ch transistor and a P-ch transistor. An instruction buffer reading control signal IQREX for controlling ON/OFF of the reading selector 41IQ is supplied to a gate of the N-ch transistor via the route β. The instruction buffer reading control signal IQREX is inverted by the inverter $I_{26}$ before given to a gate of the P-ch transistor. An output terminal of the transfer gate $TG_4$ is connected to an instruction buffer bus line IQBUS (corresponding to the route γ) of the instruction processor bus $B_{12}$.

The operation in reading out an instruction queue from the DRAM 21 or the cache memory 22 to the CPU 3 will be described. The transistor $T_{22}$ (or $T_{24}$) in the reading latch circuit 42IQ is turned ON by an H-level signal applied to the internal bus line ITB (or inverted internal bus line ZITB), and an L-level signal of the ground potential is applied to a latch circuit composed of inverters $I_{21}$ and $I_{22}$ at a timing when the instruction buffer reading clock IQCL is in H-level. The signal latched at the latch circuit is inverted by the inverter $I_{23}$, and then sent to the entry selecting unit 43IQ. When the instruction buffer entry selecting signal IQENT is in H-level (or L-level), and the inverted instruction buffer entry selecting signal ZIQENT is in L-level (or H-level), the transfer gate $TG_2$ (or $TG_3$) is turned ON. As a result, one of the outputs from the two reading latch circuits 42IQ is selected, inverted by the inverters $I_{24}$ and $I_{25}$ and then given to the transfer gate $TG_4$ in the reading selector 41IQ. Here, when the instruction buffer reading control signal IQREX from the memory controller is in H-level, the transfer gate $TG_4$ is turned ON, with the instruction signal from the entry selecting unit 43IQ supplied to the CPU 3 via the instruction buffer bus line IQBUS.

In the example shown in FIG. 16, the instruction buffer 4IQ has two reading latch circuits 42IQ. While the instruction signal is transmitted from one reading latch circuit 42IQ to the CPU 3, the instruction signal at the next address is fed from the memory to the other reading latch circuit 42IQ via the internal bus line ITB / inverted internal bus line ZITB. At this time, the instruction buffer reading clock IQCL to be supplied to the other reading latch circuit 42IQ is set to H-level. After all instruction signals are sent from the one reading latch circuit 42IQ to the CPU 3, the instruction buffer entry selecting signal IQENT is reversed, and the output signals of the other reading latch circuit 42IQ are transferred to the CPU 3 sequentially. Similarly, while the instruction signal held in the other reading latch circuit 42IQ is transmitted to the CPU 3, the instruction signal at the further next address is given from the memory to the one reading latch circuit 42IQ. After all instruction signals held in the other reading latch circuit 42IQ are sent to the CPU 3, the instruction buffer entry selecting signal IQENT is reversed, and the output signals held in the one reading latch circuit 42IQ are transferred to the CPU 3 sequentially.

When the chip is equipped with a low-speed memory, the reading operation for instruction signals can be performed at a high speed if the two reading latch circuits 42IQ are sequentially driven in the above manner.

Figure 17:
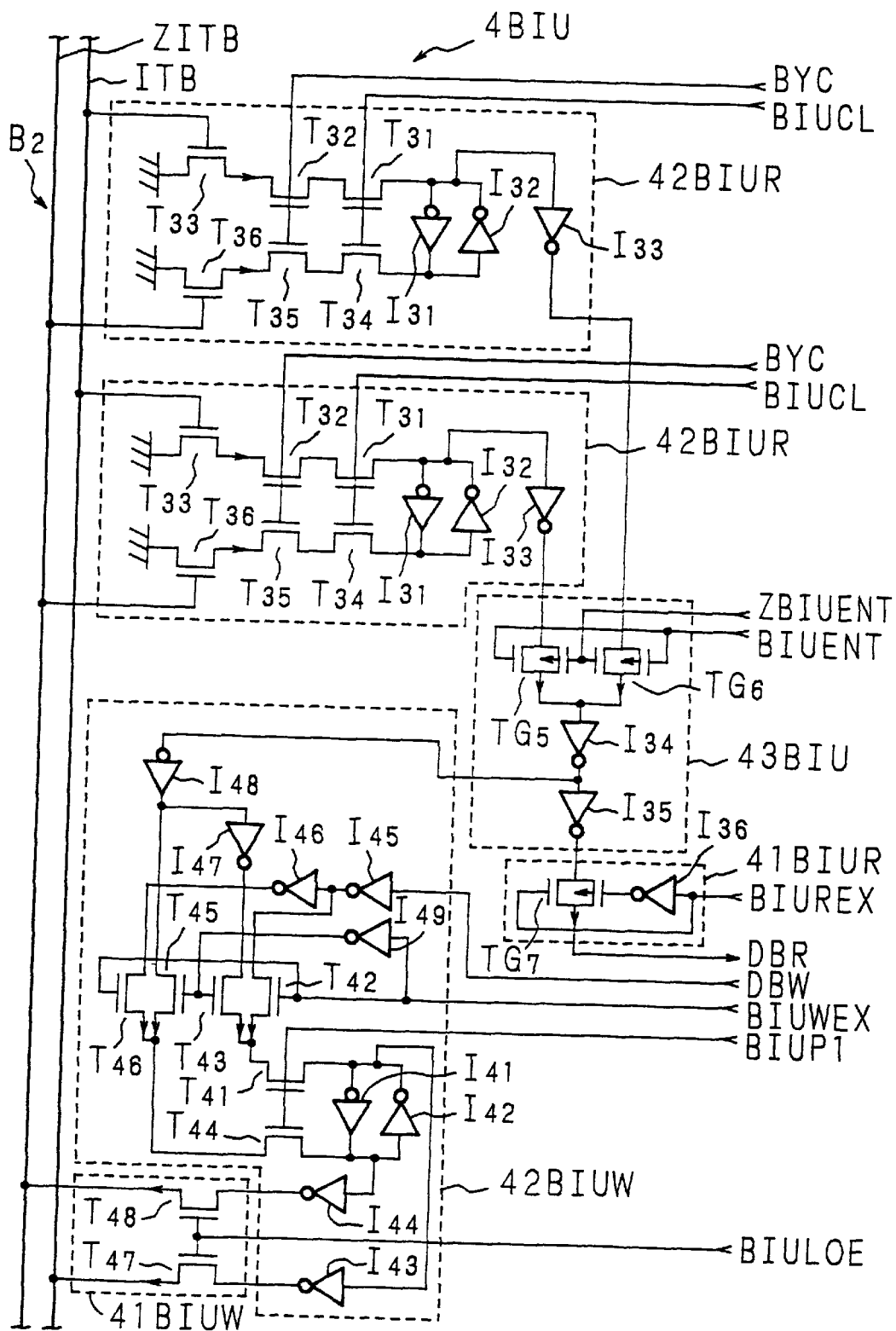
FIG. 17 is a circuit diagram of the bus interface unit.

FIG. 17 is a circuit diagram of the bus interface unit 4BIU. The bus interface unit 4BIU is composed of two reading latch circuits 42BIUR, an entry selecting unit 43BIU, a reading selector 41BIUR, a writing latch circuit 42BIUW and a writing selector 41BIUW.

The reading latch circuit 42BIUR is in a structure as described below. An input terminal of an inverter $I_{31}$ is connected to an output terminal of an inverter $I_{32}$. A connecting point of the terminals is grounded via N-ch transistors $T_{31}$, $T_{32}$ and $T_{33}$ and connected to an inverter $I_{33}$. An output terminal of the inverter $I_{31}$ is connected to an input terminal of the inverter $I_{32}$. A connecting point of the terminals is grounded via N-ch transistors $T_{34}$, $T_{35}$ and $T_{36}$.

A gate of the transistor $T_{33}$ is connected to the internal bus line ITB, and a gate of the transistor $T_{36}$ is connected to the inverted internal bus line ZITB. A bus interface unit reading clock BIUCL for controlling a latching timing is applied to gates of the transistors $T_{31}$ and $T_{34}$ via the route α. The bus interface unit reading clocks BIUCL in the two reading latch circuits 42BIU are independently controlled, for example, by the memory controller. A byte control signal BYC for controlling reading per byte is supplied to gates of the transistors $T_{32}$ and $T_{35}$ via the route δ. The byte control signal BYC is shared in the two reading latch circuits 42BIUR.

The entry selecting unit 43BIU is composed of transfer gates $TG_5$ and $TG_6$ and inverters $I_{34}$ and $I_{35}$. An output terminal of the inverter $I_{33}$ in one reading latch circuit 42BIUR is connected to the transfer gate $TG_5$ composed of an N-ch transistor and a P-ch transistor. An output terminal of the inverter $I_{33}$ in the other reading latch circuit 42BIUR is connected to the transfer gate $TG_6$ composed of an N-ch transistor and a P-ch transistor. A bus interface unit entry selecting signal BIUENT for selecting one of output signals from two reading latch circuits 42BIUR is applied to a gate of the N-ch transistor in the transfer gate $TG_5$ and a gate of the P-ch transistor in the transfer gate $TG_6$ via the route α. Also, an inverted bus interface unit entry selecting signal ZBIUENT is applied to a gate of the P-ch transistor in the transfer gate $TG_5$ and a gate of the N-ch transistor in the transfer gate $TG_6$ via the route α. Output terminals of the transfer gates $TG_5$ and $TG_6$ are connected to a series circuit composed of inverters $I_{34}$ and $I_{35}$.

The reading selector 41BIUR includes a transfer gate $TG_7$ and an inverter $I_{36}$. An output terminal of the inverter $I_{35}$ is connected to the transfer gate $TG_7$ composed of an N-ch transistor and a P-ch transistor. A bus interface unit reading control signal BIUREX for controlling ON/OFF of the reading selector 41BIUR is supplied to a gate of the N-ch transistor via the route β. Also, the bus interface unit reading control signal BIUREX after inverted by the inverter $I_{36}$ is given to a gate of the P-ch transistor. An output terminal of the transfer gate $TG_7$ is connected to a reading signal output bus line DBR (corresponding to the route θ) of the external bus $B_4$.

The writing latch circuit 42BIUW is constituted as described hereinbelow. An input terminal of an inverter $I_{41}$ is connected to an output terminal of an inverter $I_{42}$. A connecting point of the terminals is connected to a writing signal input bus line DBW (corresponding to the route θ) via N-ch transistors $T_{41}$ and $T_{42}$ and an inverter $I_{45}$. Also, the connecting point is connected to a connecting point of the inverters $I_{34}$ and $I_{35}$ via the N-ch transistor $T_{41}$ and an N-ch transistor $T_{43}$ and inverters $I_{47}$ and $I_{48}$. Further, the connecting point is connected to an inverter $I_{43}$.

An output terminal of the inverter $I_{41}$ is connected to an input terminal of the inverter $I_{42}$. A connecting point of the terminals is connected to the writing signal input bus line DBW via N-ch transistors $T_{44}$ and $T_{46}$ and an inverter $I_{46}$ and the inverter $I_{45}$. Also, the connecting point is connected to a connecting point of the inverters $I_{47}$ and $I_{48}$ via the N-ch transistor $T_{44}$ and an N-ch transistor $T_{45}$. Further, the connecting point is connected to an inverter $I_{44}$.

A bus interface unit writing clock BIUP1 for controlling a latching timing is applied to gates of the transistor $T_{41}$ and $T_{44}$ via the route α. A bus interface unit writing control signal BIUWEX for controlling inputting of a writing signal from outside is applied to gates of the transistors $T_{42}$ and $T_{46}$ via the route ε. Also, the bus interface unit writing control signal BIUWEX is inverted by an inverter $I_{49}$ and then applied to gates of the transistors $T_{43}$ and $T_{45}$.

An output terminal of the inverter $I_{43}$ is connected to the internal bus line ITB via an N-ch transistor $T_{47}$ in the writing selector 41BIUW. An output terminal of the inverter $I_{44}$ is connected to the inverted internal bus line ZITB via an N-ch transistor $T_{48}$ in the writing selector 41BIUW. A bus interface unit latch output enable signal BIULOE for controlling ON/OFF of the writing selector 41BIUW is supplied to gates of the transistors $T_{47}$ and $T_{48}$ via the route ε.

The operation in reading out signals in the DRAM 21 or the cache memory 22 to output from the chip 1 will be described. The transistor $T_{33}$ (or $T_{36}$) in the reading latch circuit 42BIUR is turned ON by an H-level signal applied to the internal bus line ITB (or inverted internal bus line ZITB), and an L-level signal of the ground potential is applied to a latch circuit composed of the inverters $I_{31}$ and $I_{32}$ at a timing when the byte control signal BYC and the bus interface unit reading clock BIUCL are in H-level. The signal latched and outputted from the latch circuit is inverted by the inverter $I_{33}$, and then sent to the entry selecting unit 43BIU. When the bus interface unit entry selecting signal BIUENT is in H-level (or L-level), and the inverted bus interface unit entry selecting signal ZBIUENT is in L-level (or H-level), the transfer gate $TG_5$ (or $TG_6$) is turned ON. As a result of this, one of the outputs from the two reading latch circuits 42BIUR is selected, inverted by the inverters $I_{34}$ and $I_{35}$ and then given to the transfer gate $TG_7$ in the reading selector 41BIUR. Here, if the bus interface unit reading control signal BIUREX from the memory controller is in H-level, the transfer gate $TG_7$ is turned ON, and the signal from the entry selecting unit 43BIU is supplied to the pad 7 via the reading signal output bus line DBR.

In the circuit example shown in FIG. 17, the bus interface unit 4BIU has two reading latch circuits 42BIU. Similar to the case of the instruction buffer 4IQ, while the signal held in one reading latch circuit 42BIU is transmitted outside via the pad 7, the signal at the next address is preparatorily given from the memory to the other reading latch circuit 42BIU. Hence, the reading operation for reading signals can be performed at a high speed.

The operation in writing signals from outside of the chip 1 into the DRAM 21 or the cache memory 22 will be described. A signal of H-level supplied from the writing signal input bus line DBW is inverted by the inverters $I_{45}$ and $I_{46}$ and then given to a source of the transistor $T_{46}$. Moreover, the signal is inverted by the inverter $I_{45}$ and then given to a source of the transistor $T_{42}$. An output signal of the inverter $I_{34}$ in the entry selecting unit 43BIU is inverted by the inverters $I_{48}$ and $I_{47}$ and given to a source of the transistor $T_{43}$. Also, the output signal is inverted by the inverter $I_{48}$ and sent to a source of the transistor $T_{45}$. The transistors $T_{42}$ and $T_{46}$ (or $T_{43}$ and $T_{45}$) are turned ON, by the bus interface unit writing control signal BIUWEX of H-level (L-level). Moreover, an H-level signal is applied to a latch circuit composed of the inverters $I_{41}$ and $I_{42}$ at a timing when the bus interface unit writing clock BIUP1 is in H-level. The signal latched and outputted here is inverted by the inverters $I_{43}$ and $I_{44}$. If the bus interface unit latch output enable signal BIULOE is in H-level, the transistors $T_{47}$ and $T_{48}$ in the writing selector 41BIUW are turned ON, and the signal of H-level (or L-level) is supplied to the internal bus line ITB (or inverted internal bus line ZITB).

Layouts of the memory cell regions 2, the CPU 3 and the buffer 4 with the bus length taken into consideration will be described hereinafter.

[Embodiment 6]

Figure 18:
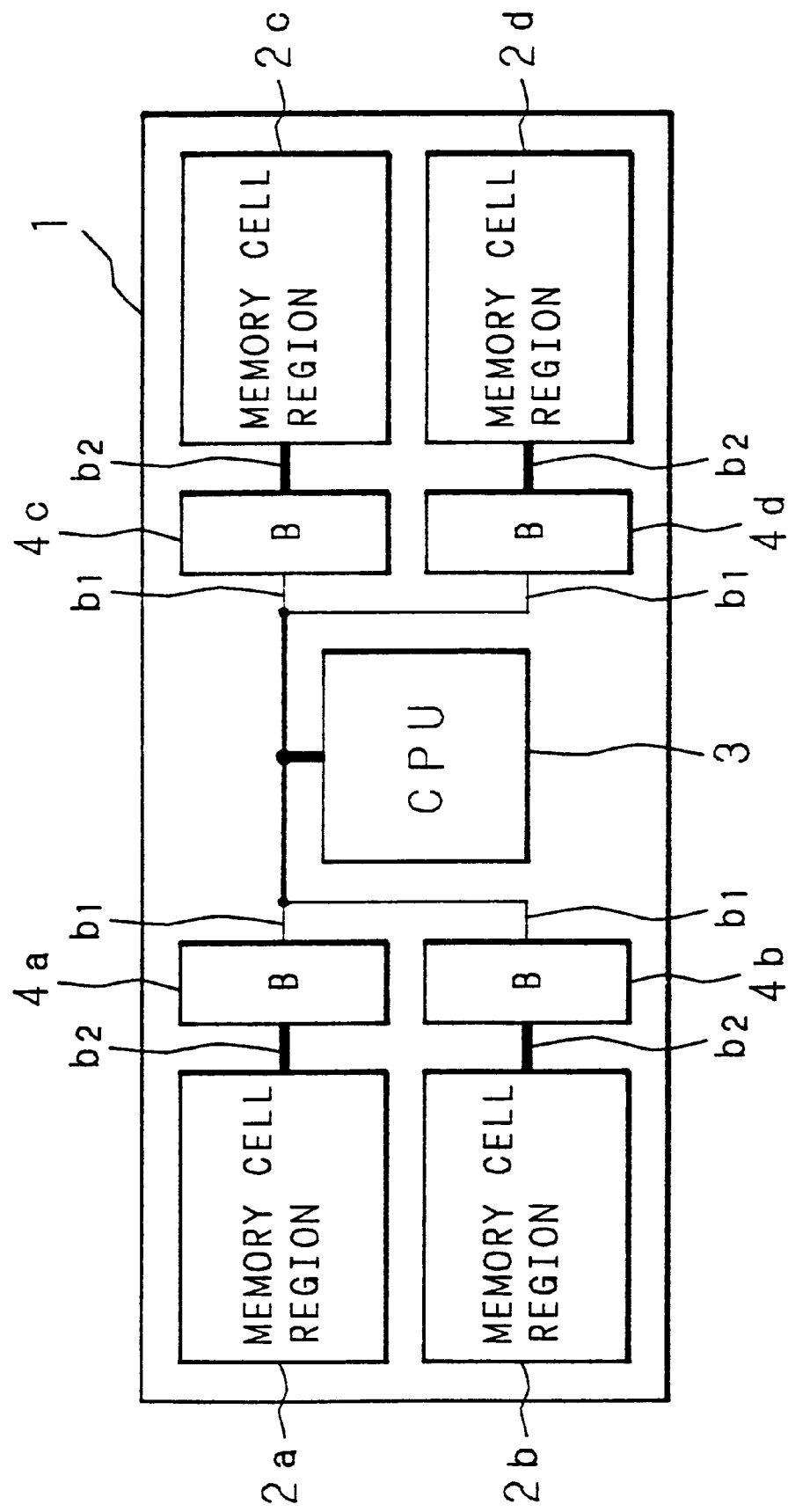
FIG. 18 is a schematic plan view showing a main portion in a microcomputer according to a sixth embodiment.

FIG. 18 is a schematic diagram of a layout showing a main portion of a microcomputer according to a sixth embodiment. Four laterally-long memory cell regions 2a, 2b, 2c and 2d are respectively arranged at four corners on a rectangular chip 1 to form two rows (2a and 2b, and 2c and 2d). Long sides of the memory cell regions are made adjacent to each other in each row. The rows are spaced apart by a predetermined gap, and a CPU 3 is set nearly at the center of the rows (namely, nearly at the center of the chip 1). The CPU 3 is a typical processor such as a 'CPU Core' disclosed in "Mitsubishi Electric Corporation, M16/10 Group User's Manual". Moreover, buffers 4a, 4b, 4c and 4d are respectively disposed near inner short sides of the memory cell regions 2a, 2b, 2c and 2d.

Memory buses $b_2$ having a large width (for example, 32 bits) connects inner short sides of the memory cell region 2a arranged at the upper left of the chip 1, the memory cell region 2b at the lower left portion, the memory cell region 2c at the upper right and the memory cell region 2d at the lower right with the buffers 4a, 4b, 4c and 4d, respectively. A processor bus (for example, 32 bits) drawn out from the upper side of the CPU 3 is parted right and left into two, and each of the two is further parted into two. The resulting four processor buses $b_1$ (for example, 8 bits) are respectively connected to the buffers 4a, 4b, 4c and 4d.

In this structure, the CPU 3 connected to the 32-bit processor bus is connected to the memory connected to the memory bus of, for example, 128 bits in combination of the memory buses $b_2$ connected to the memory cell regions 2a, 2b, 2c and 2d, via a buffer 4 (4a, 4b, 4c and 4d).

[Embodiment 7]

Figure 19:
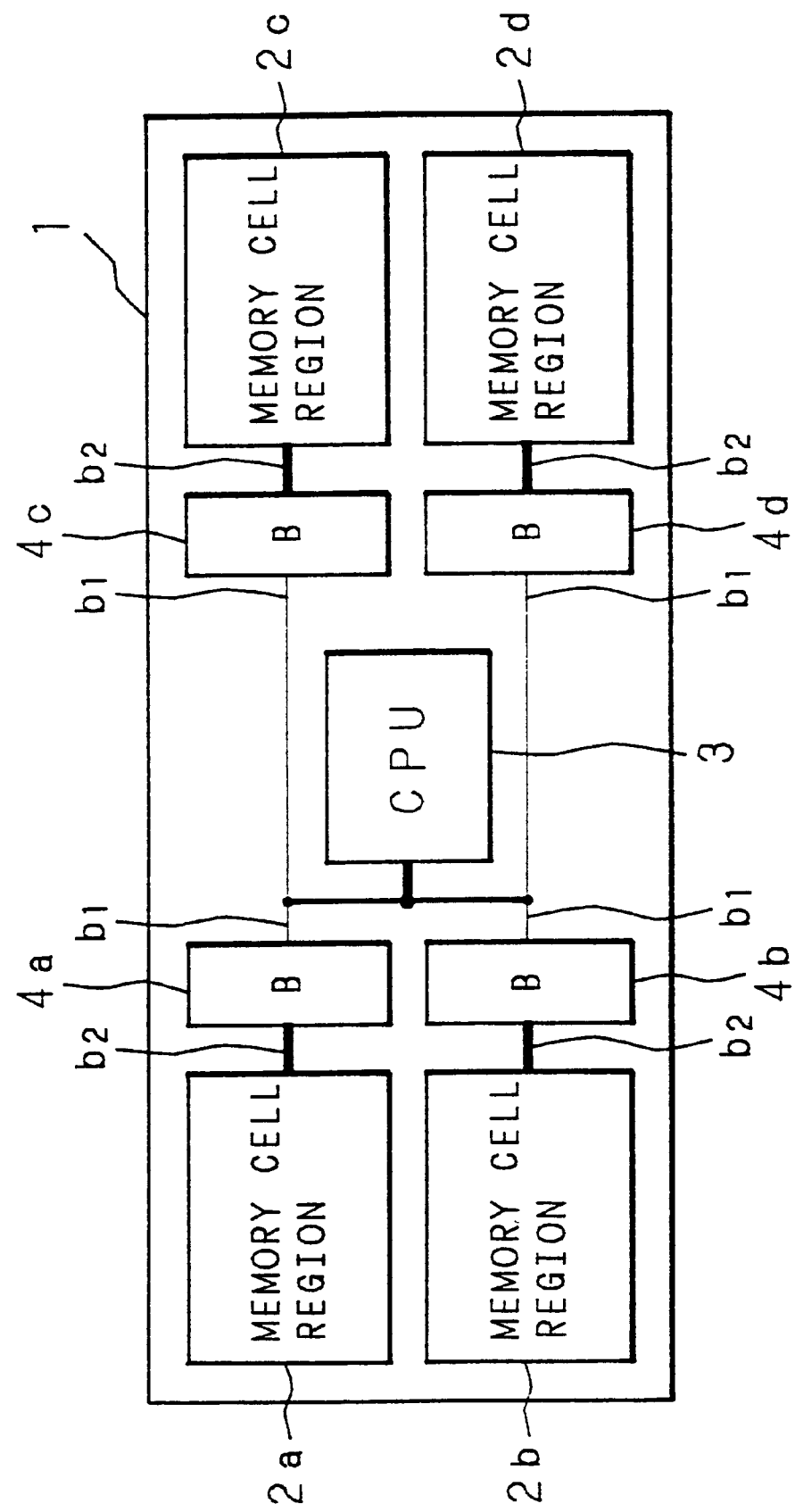
FIG. 19 is a schematic plan view showing a main portion in a microcomputer according to a seventh embodiment.

FIG. 19 is a schematic layout diagram showing a main portion of a microcomputer according to a seventh embodiment. Memory buses $b_2$ are drawn from inner short sides of memory cell regions 2a, 2b, 2c and 2d, and connected with buffers 4a, 4b, 4c and 4d, respectively. A processor bus drawn from the left side (or right side) of a CPU 3 is parted up and down into two, and each of the two is further parted right and left into two. Eventually four processor buses $b_1$ are respectively connected to the buffers 4a, 4b, 4c and 4d.

The sixth embodiment is suitable for a case where signals are outputted from one side (upper side or lower side) of the chip 1. On the other hand, the seventh embodiment is suitable for a case where signals are outputted from two sides (upper side and lower side) of the chip.

[Embodiment 8]

Figure 20:
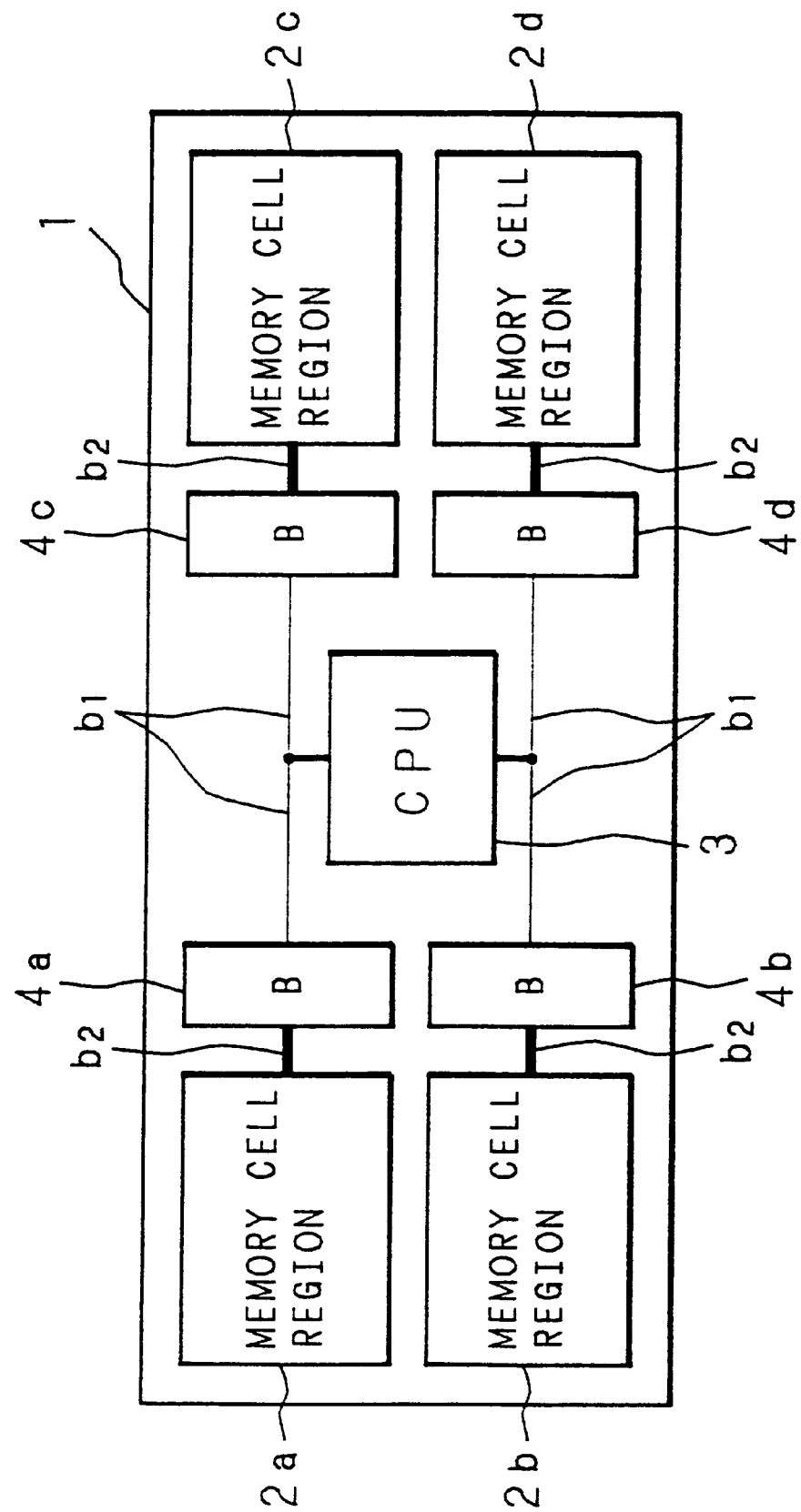
FIG. 20 is a schematic plan view showing a main portion in a microcomputer according to an eighth embodiment.

FIG. 20 is a schematic layout diagram showing a main portion of a microcomputer according to an eighth embodiment. Memory buses $b_2$ are drawn from inner short sides of memory cell regions 2a, 2b, 2c and 2d, and connected with buffers 4a, 4b, 4c and 4d, respectively. Processor buses are vertically drawn from the upper side and the lower side of the CPU 3, each of which is further parted into right and left two buses. The four processor buses $b_1$ are respectively connected to the buffers 4a, 4b, 4c and 4d.

In this embodiment, the processor buses of two branches are drawn from two sides of the CPU 3. This makes it possible to control the processor buses connected to the memory cell regions 2a and 2c and the processor buses connected to the memory cell regions 2b and 2d independently of each other to access the regions in parallel. Hence, this embodiment is suitable to a case where the memory cell regions 2a and 2c are different from the memory cell regions 2b and 2d in size or purpose. Also, the length of the processor bus in this embodiment is rendered shorter than that in the sixth and seventh embodiments because the processor bus is divided into two.

[Embodiment 9]

Figure 21:
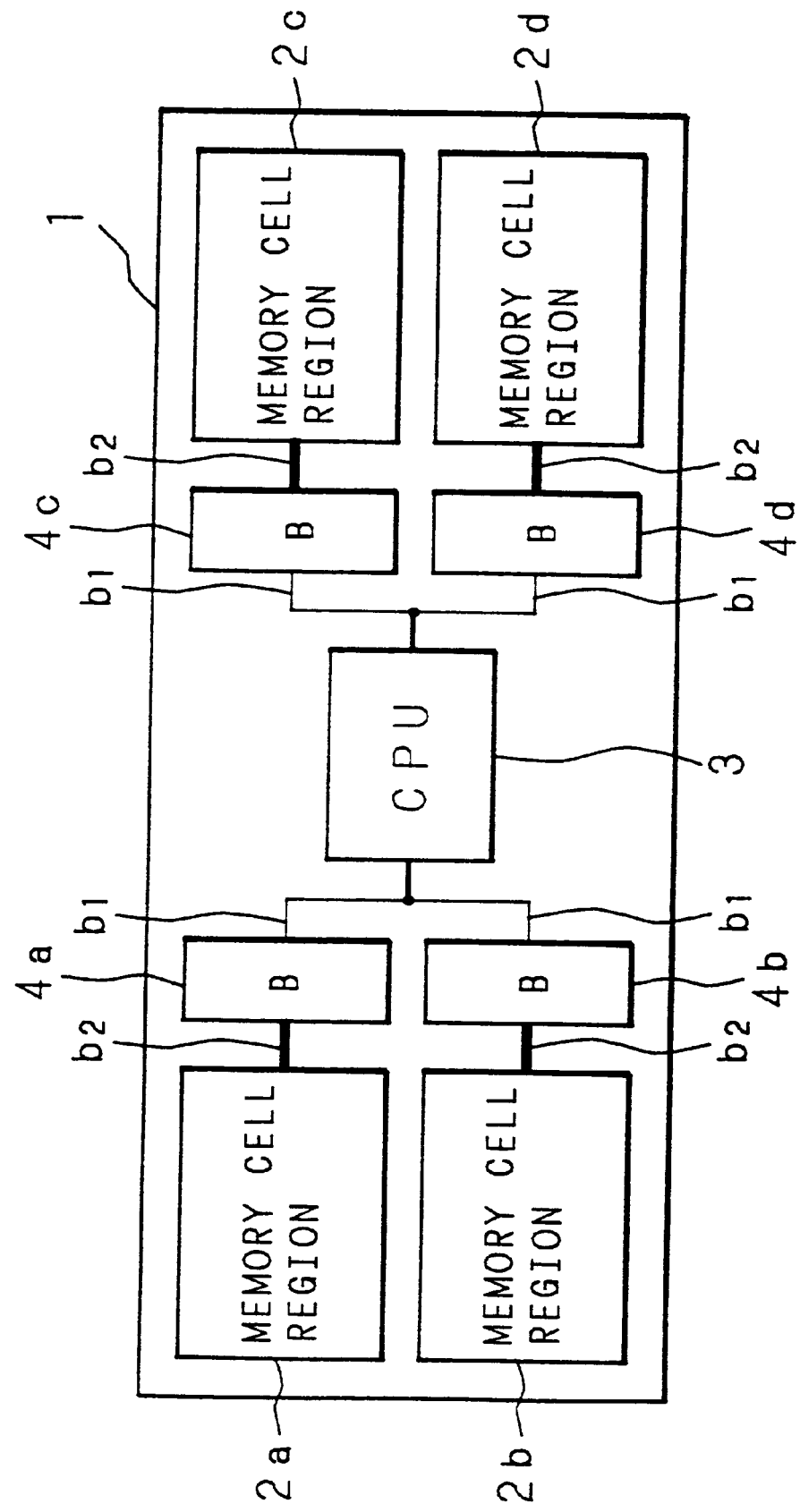
FIG. 21 is a schematic plan view showing a main portion in a microcomputer according to a ninth embodiment.

FIG. 21 is a schematic layout diagram showing a main portion of a microcomputer according to a ninth embodiment. Memory buses $b_2$ are drawn from inner short sides of memory cell regions 2a, 2b, 2c and 2d, and each bus is connected with a buffer 4a, 4b, 4c or 4d. Two processor buses are horizontally drawn from the right side and the left side of a CPU 3, each of which is further parted up and down into two. The four processor buses $b_1$ are respectively connected to the buffers 4a, 4b, 4c and 4d.

In this embodiment, the processor buses of two branches are drawn from two sides of the CPU 3. This makes it possible to control the processor buses connected to the memory cell regions 2a and 2b and the processor buses connected to the memory cell regions 2c and 2d independently of each other to access the regions in parallel. Hence, this embodiment is suitable to a case where the memory cell regions 2a and 2b are different from the memory cell regions 2c and 2d in size or purpose. Also, the length of the processor bus in this embodiment becomes shorter than that in the sixth and seventh embodiments because the processor bus is divided into two.

[Embodiment 10]

Figure 22:
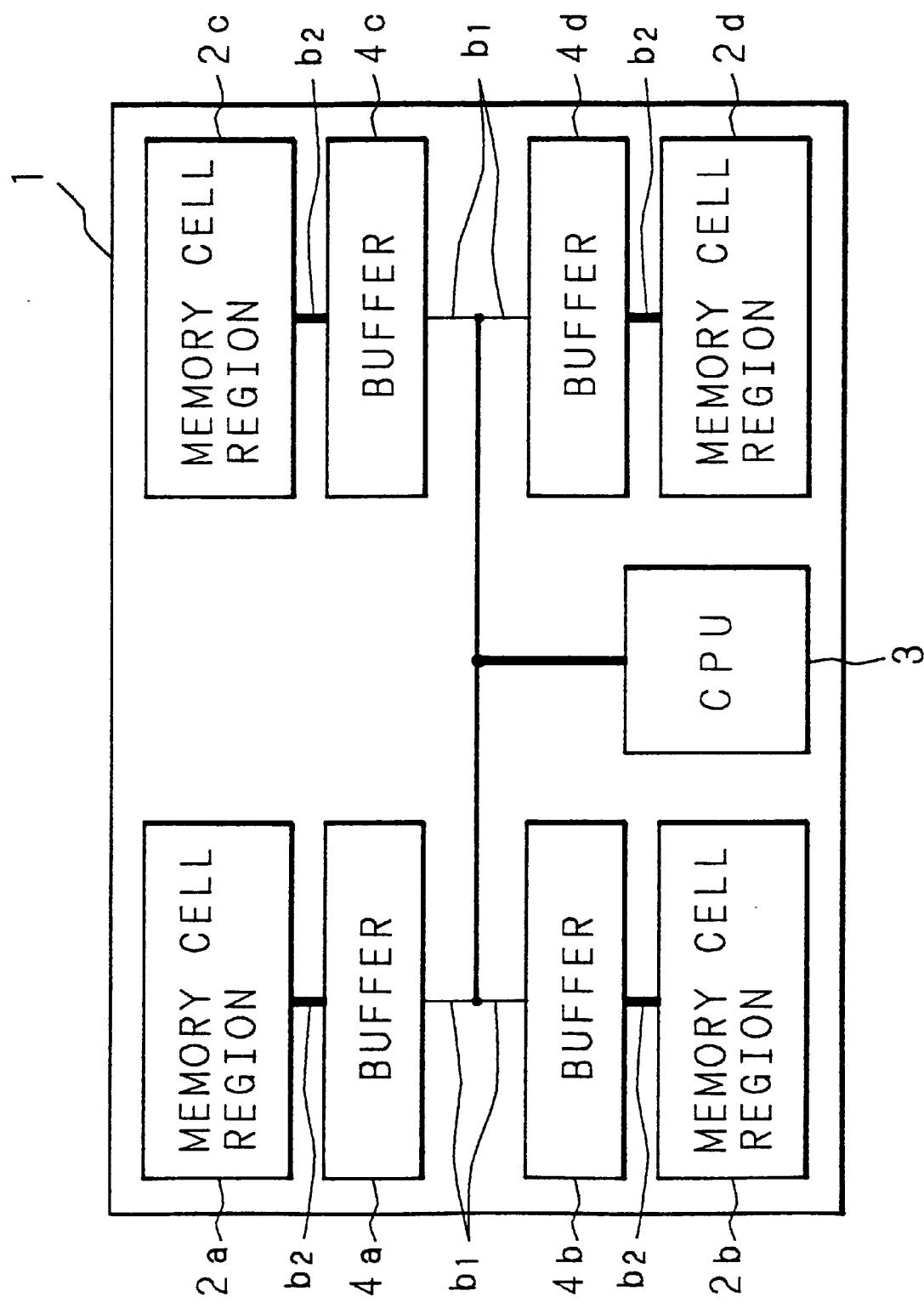
FIG. 22 is a schematic plan view showing a main portion in a microcomputer according to a tenth embodiment.

FIG. 22 is a schematic layout diagram showing a main portion of a microcomputer according to a tenth embodiment. In this embodiment, buffers 4a, 4b, 4c and 4d are arranged near inner long sides of memory cell regions 2a, 2b, 2c and 2d respectively, and a CPU 3 is disposed at the lower central part between the memory cell regions 2b and 2d. Memory buses $b_2$ connect the inner long sides of the memory cell regions 2a, 2b, 2c and 2d and long sides of the buffers 4a, 4b, 4c and 4d, respectively. A processor bus drawn from the upper side of the CPU 3 is parted right and left into two, and each of the two is further parted up and down into two. The four processor buses $b_1$ are respectively connected to the buffers 4a, 4b, 4c and 4d.

The area occupied by the buses on the chip 1 in the tenth embodiment is larger than the area in the sixth embodiment. However, more addresses can be accessed simultaneously, e.g., for reading, because each memory bus $b_2$ is drawn from the long side of the memory cell region.

[Embodiment 11]

Figure 23:
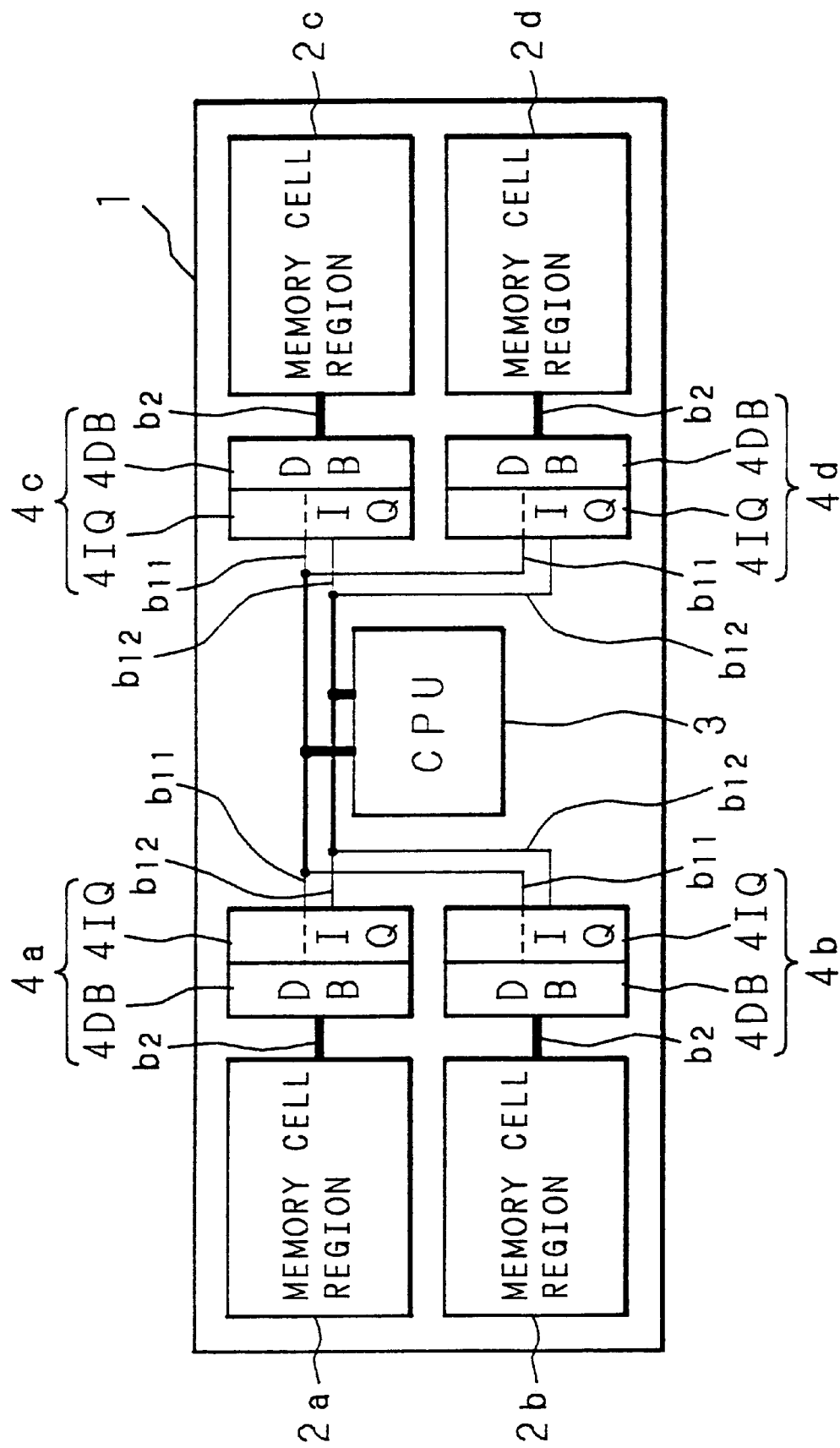
FIG. 23 is a schematic plan view showing a main portion in a microcomputer according to an 11th embodiment.

FIG. 23 is a schematic layout diagram showing a main portion of a microcomputer according to an 11th embodiment. FIG. 23 shows a case where each of the buffers 4a, 4b, 4c and 4d shown in FIG. 18 includes a data buffer 4DB and an instruction buffer 4IQ. A data processor bus drawn from the upper side of a CPU 3 is parted right and left into two, and each of the two is further parted into two. The four data processor buses $b_{11}$ are respectively connected to the four data buffers 4DB. An instruction processor bus drawn from the upper side of the CPU 3 is parted right and left into two, and each of the two is further parted into two. The four instruction processor buses $b_{12}$ are respectively connected to the four instruction buffers 4IQ.

[Embodiment 12]

Figure 24:
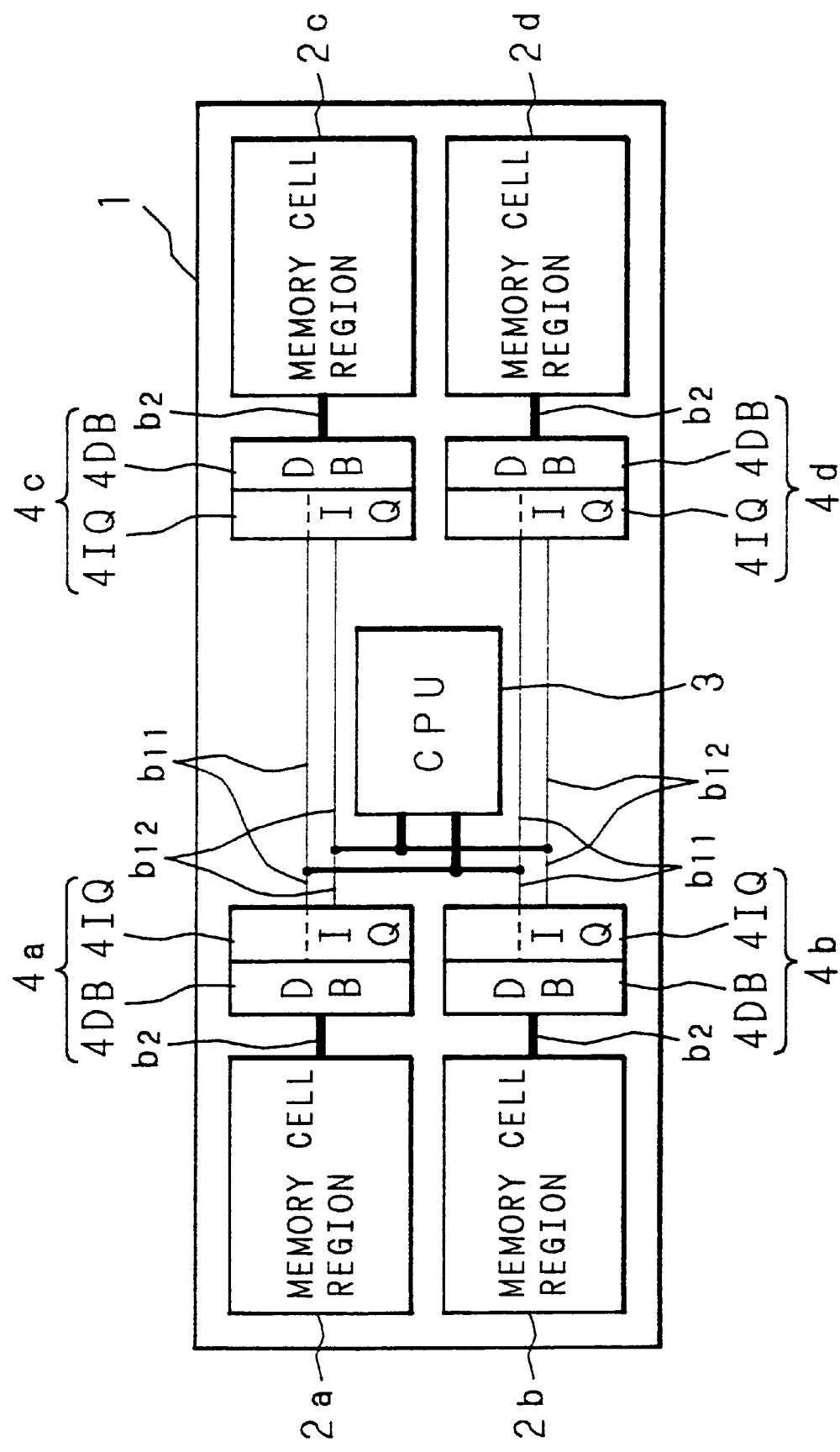
FIG. 24 is a schematic plan view showing a main portion in a microcomputer according to a 12th embodiment.

FIG. 24 is a schematic layout diagram showing a main portion of a microcomputer according to a 12th embodiment. FIG. 24 shows a case where each of the buffers 4a, 4b, 4c and 4d shown in FIG. 19 includes a data buffer 4DB and an instruction buffer 4IQ. A data processor bus drawn from the left side (or right side) of a CPU 3 is parted up and down into two, and each of the two is further parted right and left into two. The four data processor buses $b_{11}$ are respectively connected to the four data buffers 4DB. An instruction processor bus drawn from the left side (or right side) of the CPU 3 is parted up and down into two, and each of the two is further parted right and left into two. The four instruction processor buses $b_{12}$ are respectively connected to the four instruction buffers 4IQ.

[Embodiment 13]

Figure 25:
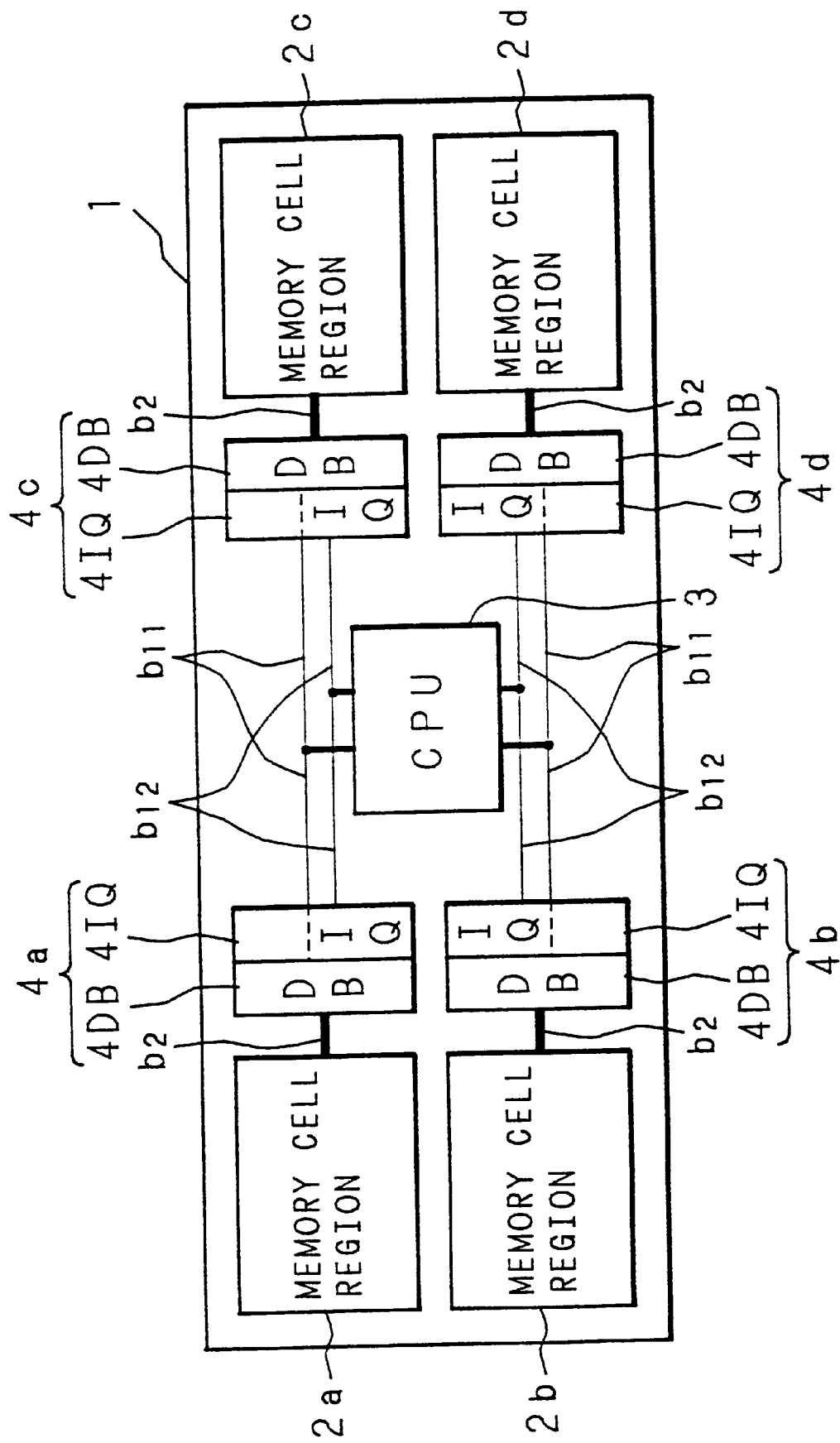
FIG. 25 is a schematic plan view showing a main portion in a microcomputer according to a 13th embodiment.

FIG. 25 is a schematic layout diagram showing a main portion of a microcomputer according to a 13th embodiment. FIG. 25 shows a case where each of the buffers 4a, 4b, 4c and 4d shown in FIG. 20 includes a data buffer 4DB and an instruction buffer 4IQ. Each of data processor buses vertically drawn from the upper side or the lower side of a CPU 3 is parted right and left into two. The four data processor buses $b_{11}$ are eventually respectively connected to the four data buffers 4DB. Each of two instruction processor buses vertically drawn from the upper side and the lower side of the CPU 3 is parted right and left into two. The four instruction processor buses $b_{12}$ are respectively connected to the four instruction buffers 4IQ.

[Embodiment 14]

Figure 26:
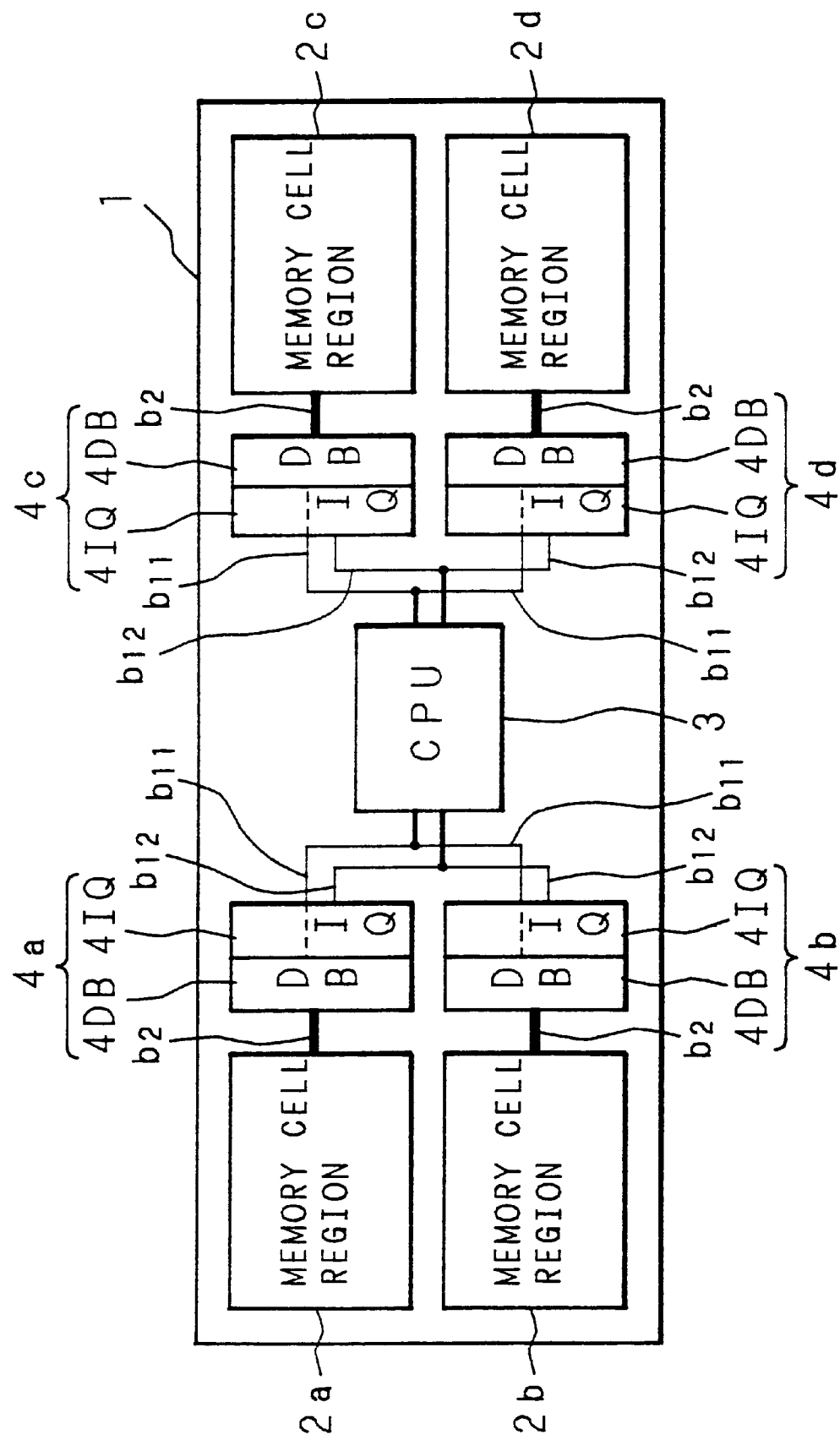
FIG. 26 is a schematic plan view showing a main portion in a microcomputer according to a 14th embodiment.

FIG. 26 is a schematic layout diagram showing a main portion of a microcomputer according to a 14th embodiment. FIG. 26 shows a case where each of the buffers 4a, 4b, 4c and 4d shown in FIG. 21 includes a data buffer 4DB and an instruction buffer 4IQ. Two data processor buses are horizontally drawn from the right side and the left side of a CPU 3, each of which is parted up and down into two. The four data processor buses $b_{11}$ are respectively connected to the four data buffers 4DB. Two instruction processor buses are horizontally drawn from the right side and the left side of the CPU 3, each of which is further parted up and down into two. The four instruction processor buses $b_{12}$ are accordingly respectively connected to the four instruction buffers 4IQ.

[Embodiment 15]

Figure 27:
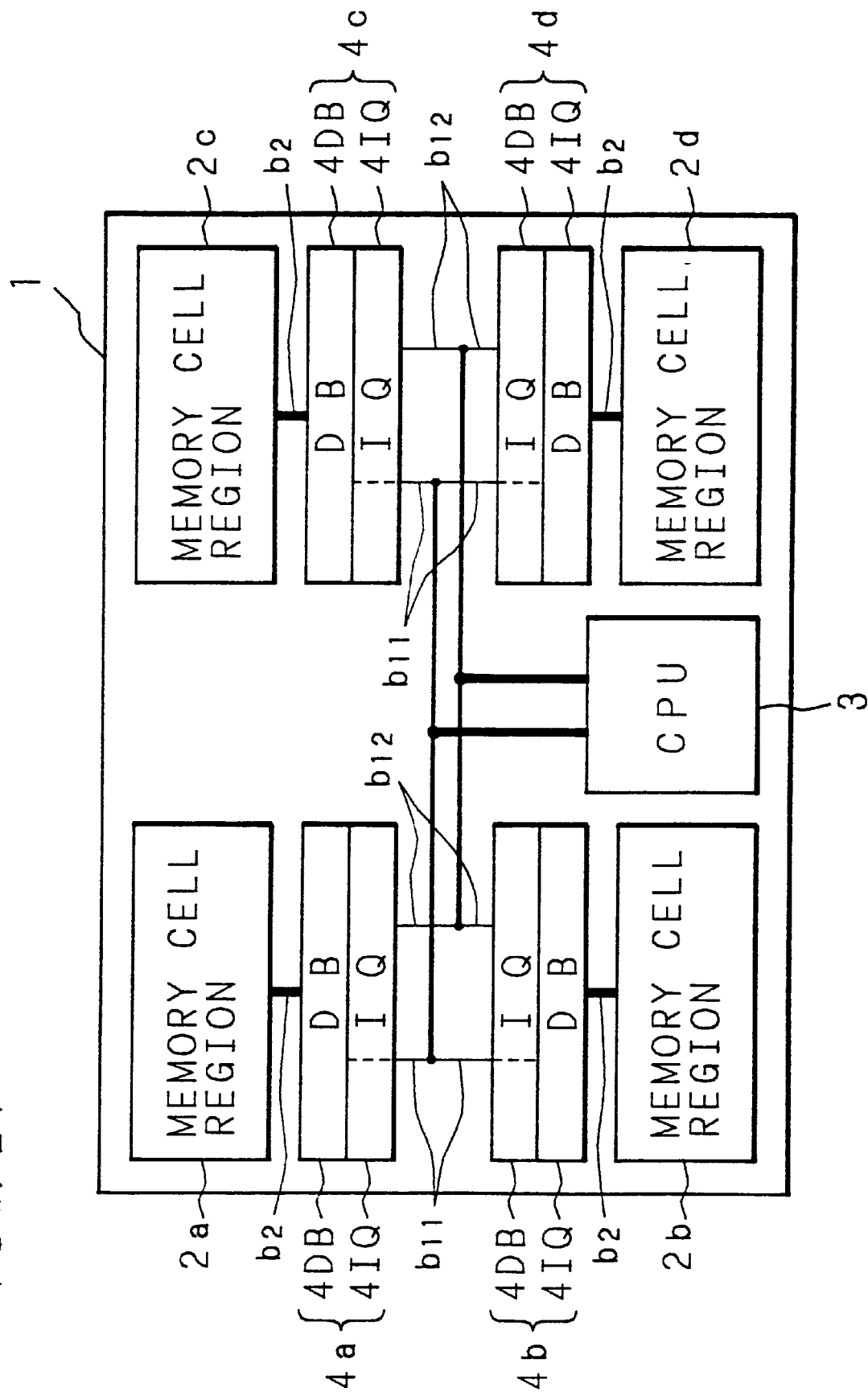
FIG. 27 is a schematic plan view showing a main portion in a microcomputer according to a 15th embodiment.

FIG. 27 is a schematic layout diagram showing a main portion of a microcomputer according to a 15th embodiment. FIG. 27 shows a case where each of the buffers 4a, 4b, 4c and 4d shown in FIG. 22 includes a data buffer 4DB and an instruction buffer 4IQ. A data processor bus drawn from the upper side of a CPU 3 is parted right and left into two, and each of the two is parted up and down into two. The four data processor buses $b_{11}$ are respectively connected to the four data buffers 4DB. An instruction processor bus drawn from the upper side of the CPU 3 is parted right and left into two, and each of the two is parted up and down into two. The four instruction processor buses $b_{12}$ are thus respectively connected to the four instruction buffers 4IQ.

In the 11th to 15th embodiments, data signals and instruction signals are processed with an improved efficiency because the microcomputer is provided with data buffers 4DB and instruction buffers 4IQ. In addition, the data signals and the instruction signals are processed independently of each other because there are provided processor buses separately for data and instruction signals.

[Embodiment 16]

Figure 28:
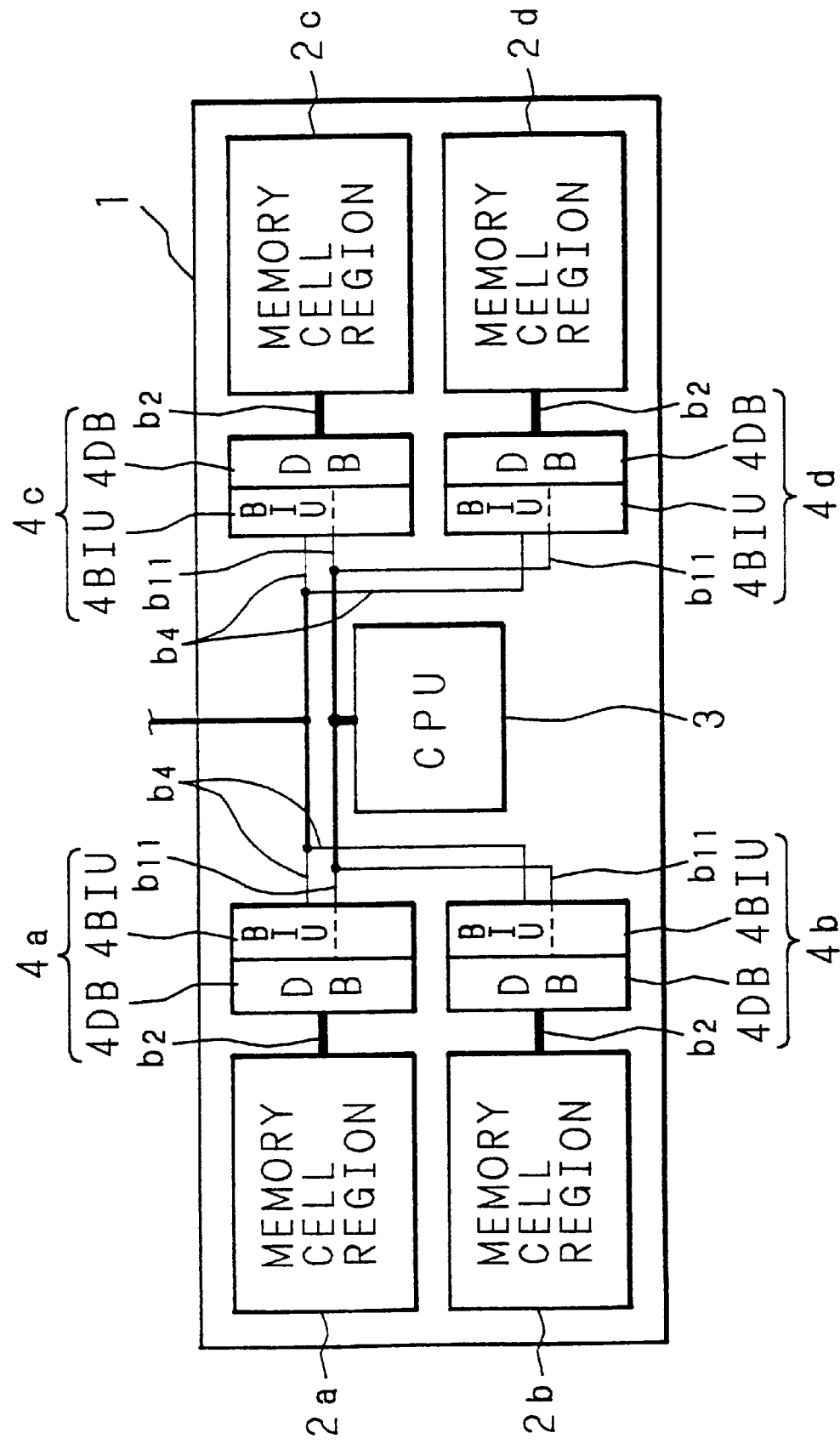
FIG. 28 is a schematic plan view showing a main portion in a microcomputer according to a 16th embodiment.

FIG. 28 is a schematic layout diagram showing a main portion of a microcomputer according to a 16th embodiment. FIG. 28 shows a case where each of the buffers 4a, 4b, 4c and 4d shown in FIG. 18 includes a data buffer 4DB and a bus interface unit 4BIU. A data processor bus from the upper side of a CPU 3 is parted right and left into two, and each of the two is further parted into two. The four data processor buses $b_{11}$ are respectively connected to the four data buffers 4DB. Four external buses $b_4$ (for example, 4 bits each) drawn out from the corresponding four bus interface units 4BIU are connected to the outside via pads arranged at the upper side of the chip 1. The pads are omitted in FIGS. 28 to 32.

[Embodiment 17]

Figure 29:
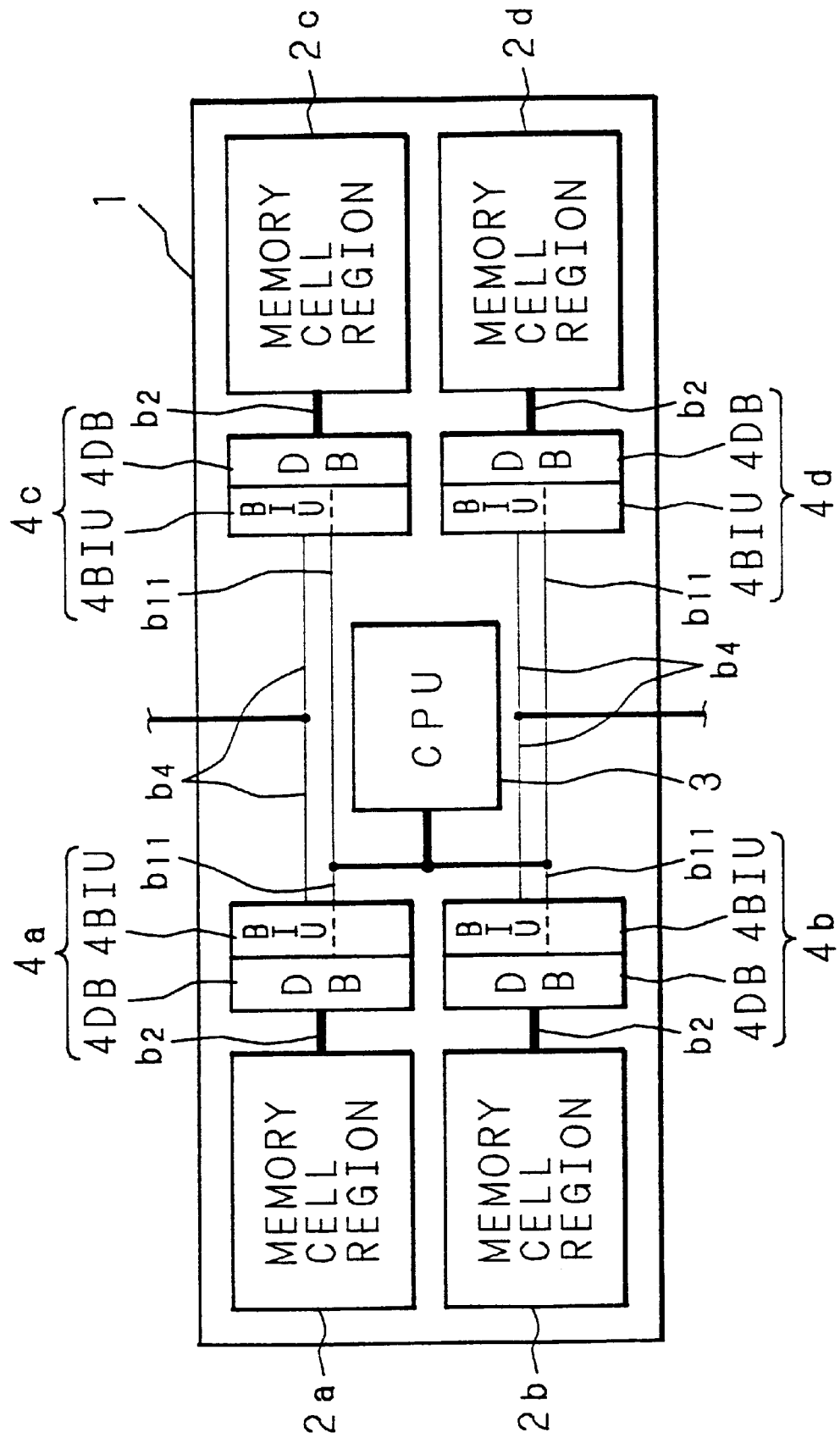
FIG. 29 is a schematic plan view showing a main portion in a microcomputer according to a 17th embodiment.

FIG. 29 is a schematic layout diagram showing a main portion of a microcomputer according to a 17th embodiment. FIG. 29 shows a case where each of the buffers 4a, 4b, 4c and 4d shown in FIG. 19 includes a data buffer 4DB and a bus interface unit 4BIU. A data processor bus drawn from the left side (or right side) of a CPU 3 is parted up and down into two, and each of the two is further parted right and left into two. The four data processor buses $b_{11}$ are respectively connected to the four data buffers 4DB. Two external buses $b_4$ out from the two bus interface units 4BIU connected with the memory cell regions 2a and 2c are connected to the outside via pads arranged at the upper side of the chip 1. The other two external buses $b_4$ from the two bus interface units 4BIU connected with the memory cell regions 2b and 2d are connected to the outside via pads arranged at the lower side of the chip 1.

[Embodiment 18]

Figure 30:
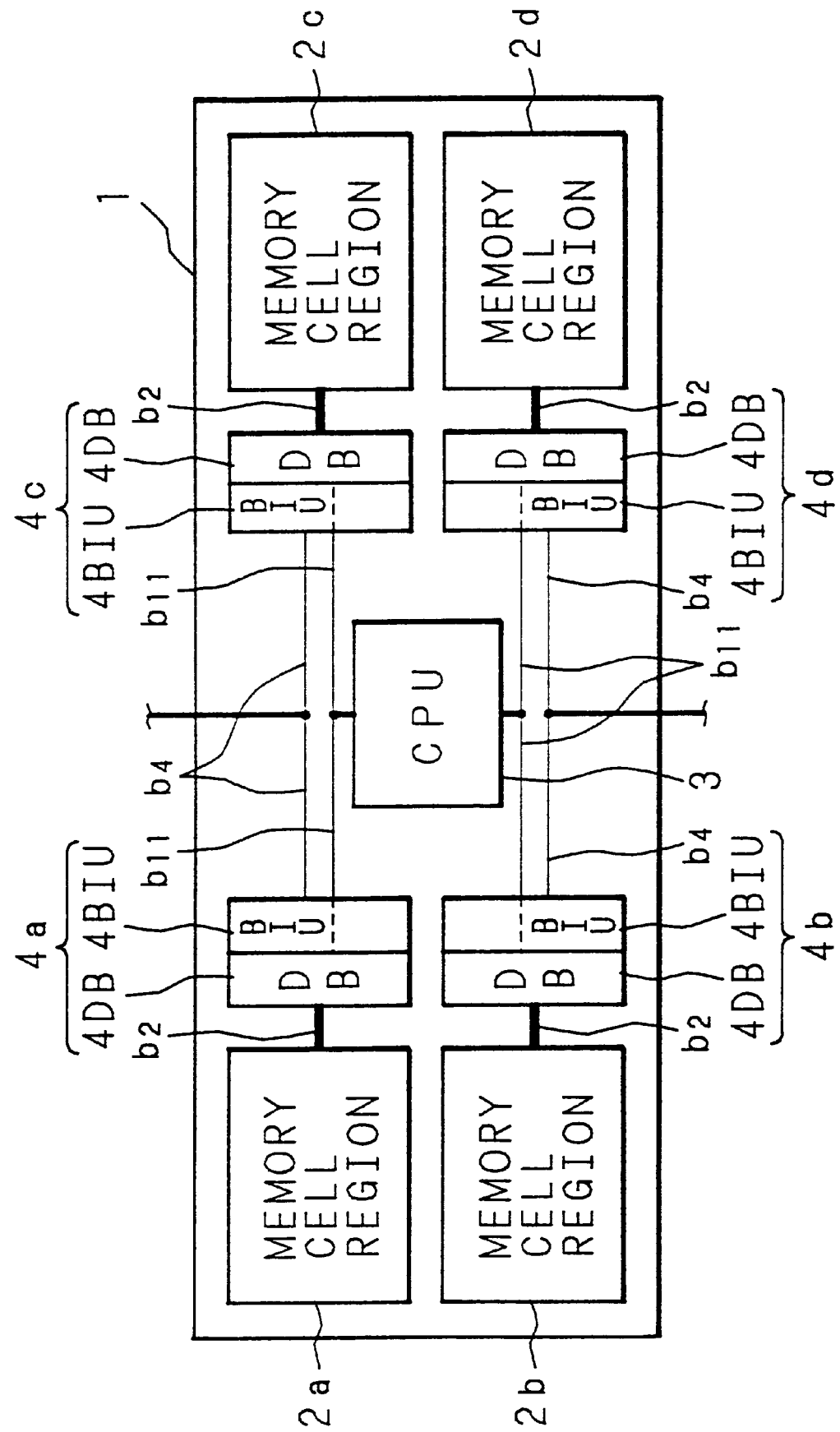
FIG. 30 is a schematic plan view showing a main portion in a microcomputer according to an 18th embodiment.

FIG. 30 is a schematic layout diagram showing a main portion of a microcomputer according to an 18th embodiment. FIG. 30 shows a case where each of the buffers 4a, 4b, 4c and 4d shown in FIG. 20 includes a data buffer 4DB and a bus interface unit 4BIU. Each of two data processor buses vertically drawn from the upper side and the lower side of a CPU 3 is parted right and left into two. The four data processor buses $b_{11}$ are consequently respectively connected to the four data buffers 4DB. Two external buses $b_4$ drawn from the two bus interface units 4BIU connected with the memory cell regions 2a and 2c are connected to the outside via pads arranged at the upper side of the chip 1. Two external buses $b_4$ drawn from the two bus interface units 4BIU connected with the memory cell regions 2b and 2d are similarly connected to the outside via pads arranged at the lower side of the chip 1.

[Embodiment 19]

Figure 31:
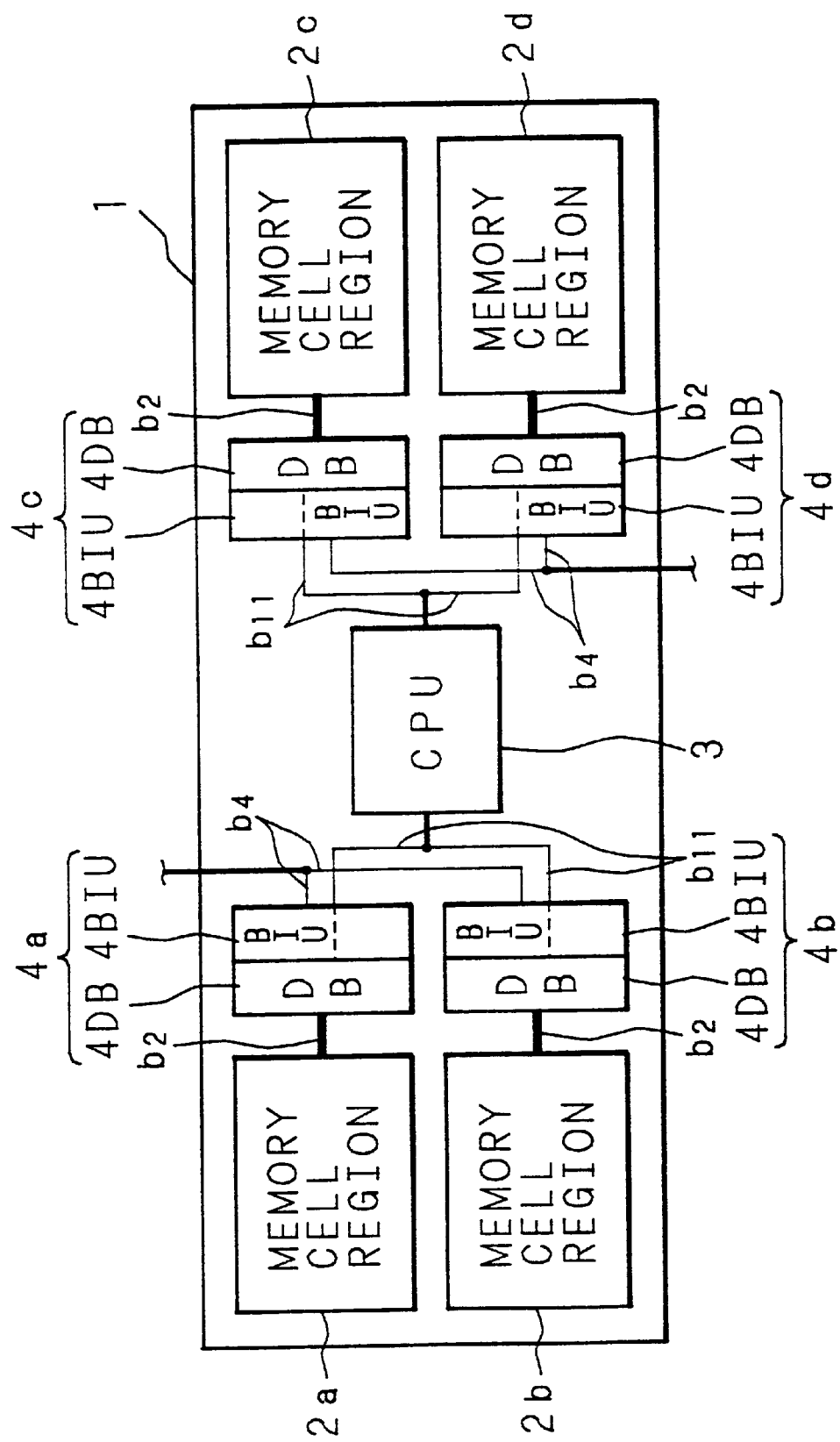
FIG. 31 is a schematic plan view showing a main portion in a microcomputer according to a 19th embodiment.

FIG. 31 is a schematic layout diagram showing a main portion of a microcomputer according to a 19th embodiment. FIG. 31 shows a case where each of the buffers 4a, 4b, 4c and 4d shown in FIG. 21 includes a data buffer 4DB and a bus interface unit 4BIU. Two data processor buses are horizontally drawn respectively from the right side and the left side of a CPU 3, each of which is parted up and down into two. The four data processor buses $b_{11}$ are respectively connected to the four data buffers 4DB. Two external buses $b_4$ drawn from the two bus interface units 4BIU connected with the memory cell regions 2a and 2b are connected to the outside via pads arranged at the upper side of the chip 1. Two external buses $b_4$ drawn from the two bus interface units 4BIU connected with the memory cell regions 2c and 2d are connected to the outside via pads arranged at the lower side of the chip 1.

[Embodiment 20]

Figure 32:
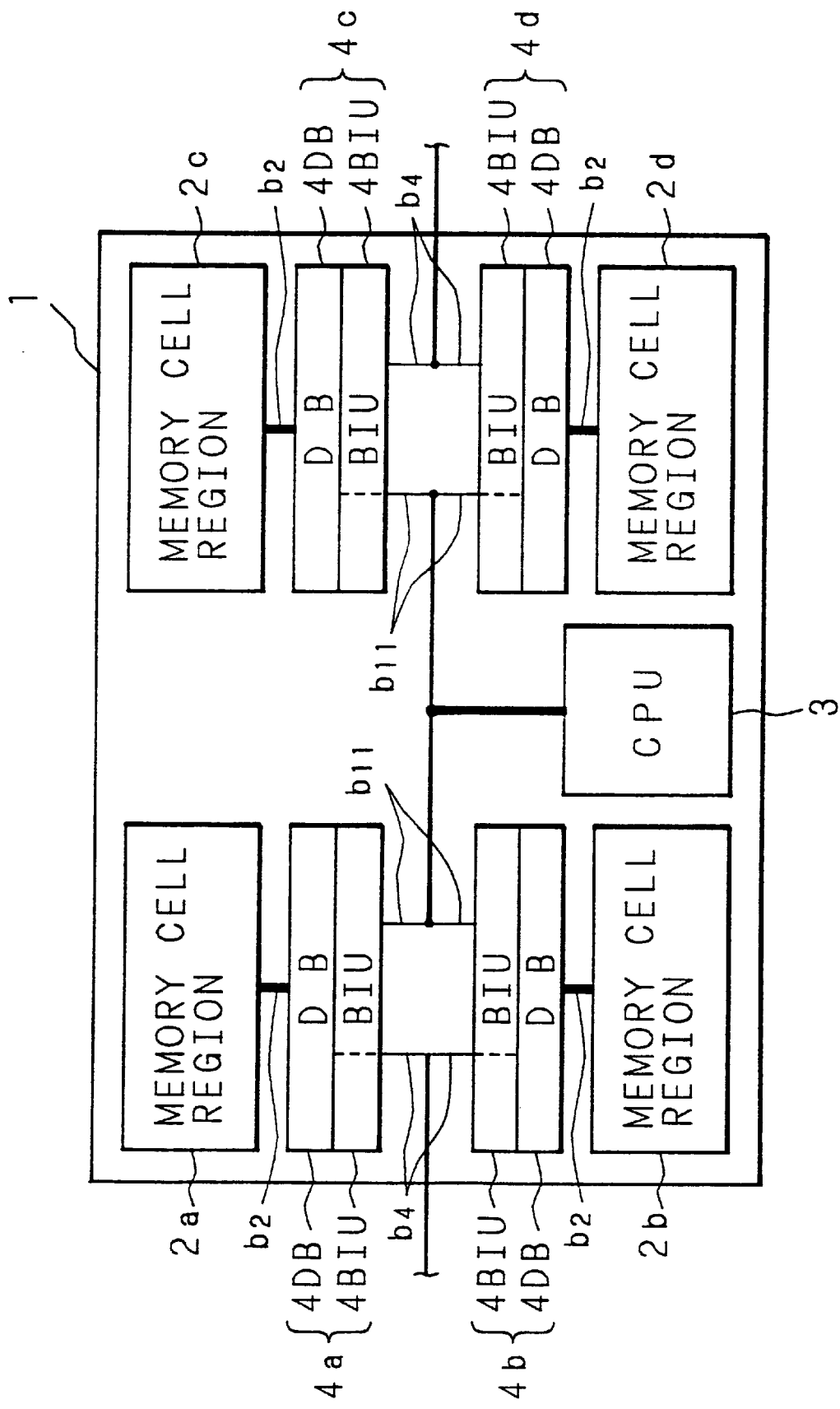
FIG. 32 is a schematic plan view showing a main portion in a microcomputer according to a 20th embodiment.

FIG. 32 is a schematic layout diagram showing a main portion of a microcomputer according to a 20th embodiment. FIG. 32 shows a case where each of the buffers 4a, 4b, 4c and 4d shown in FIG. 22 includes a data buffer 4DB and a bus interface unit 4BIU. A data processor bus drawn from the upper side of a CPU 3 is parted right and left into two, and each of the two is parted up and down into two. The four data processor buses $b_{11}$ are respectively connected to the four data buffers 4DB. Two external buses $b_4$ drawn from the corresponding two bus interface units 4BIU connected with the memory cell regions 2a and 2b are connected to the outside via pads arranged at the left side of the chip 1. Two external buses $b_4$ drawn from the remaining two bus interface units 4BIU connected with the memory cell regions 2c and 2d are connected to the outside via pads arranged at the right side of the chip 1.

In the 16th to 20th embodiments, a count of pads can be decreased, thereby making it easy to turn the microcomputer more compact and integrated, in addition to the effects achieved in the sixth to tenth embodiments. The buffers 4 may include the instruction buffers 4IQ, as shown in the 11th to 15th embodiments. Since the layout for the above arrangement is easily conceivable, the description thereof is omitted here. The arrangement exerts the effects of the 11th to 15th embodiments as well.

[Embodiment 21]

Figure 33:
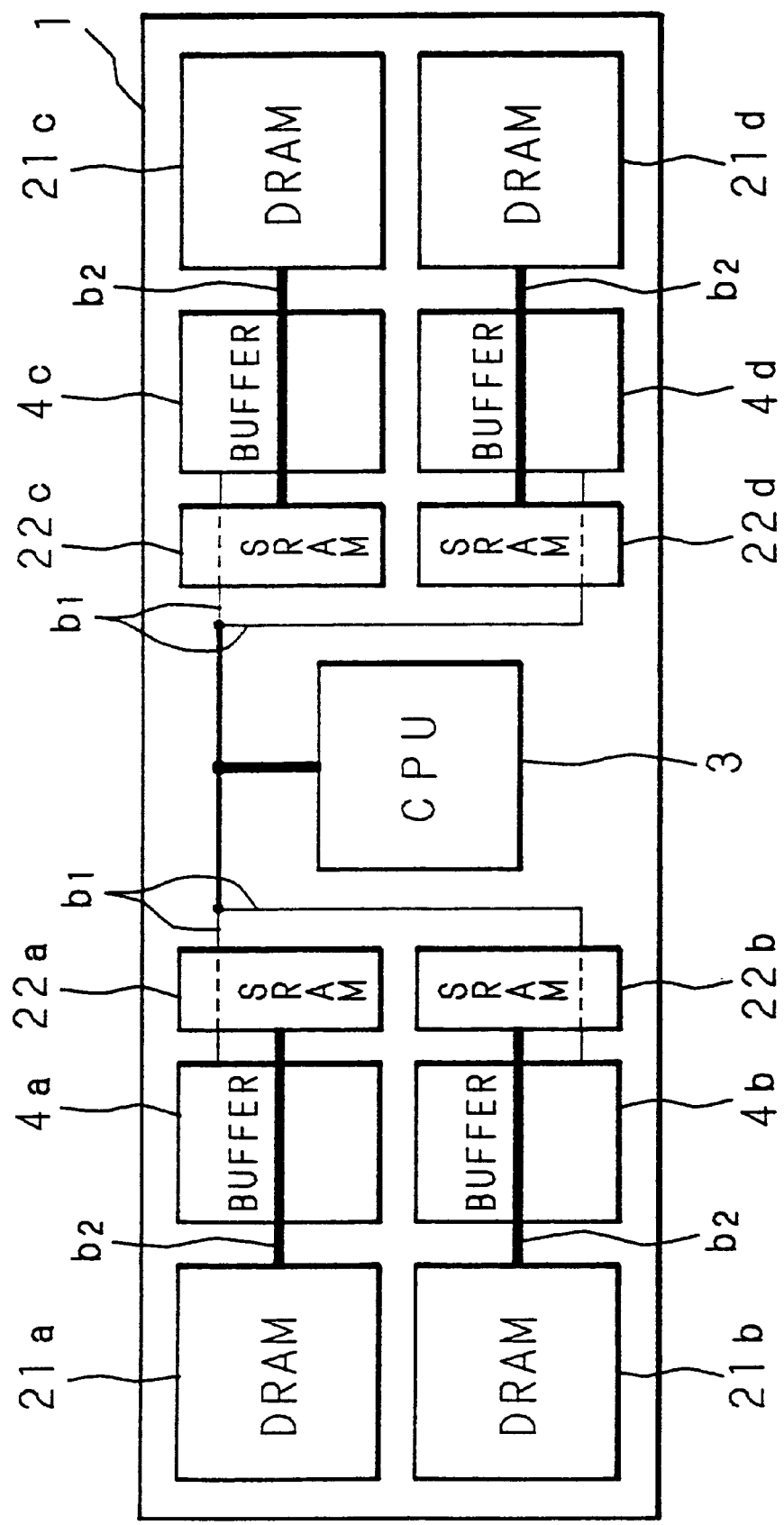
FIG. 33 is a schematic plan view showing a main portion in a microcomputer according to a 21st embodiment.

FIG. 33 is a schematic layout diagram showing a main portion of a microcomputer according to a 21st embodiment. While the four memory cell regions 2a, 2b, 2c and 2d are shown in FIG. 18, four DRAMs 21a, 21b, 21c and 21d and four high-speed cache memories (SRAMs) 22a, 22b, 22c and 22d are employed in FIG. 33 instead. The laterally-long four DRAMs 21a, 21b, 21c and 21d are arranged at four corners on a chip 1, and four buffers 4a, 4b, 4c and 4d are set near inner short sides of the DRAMs, respectively. Further, the four cache memories 22a, 22b, 22c and 22d are arranged at inner sides of the respective buffers 4a, 4b, 4c and 4d. Memory buses $b_2$ connect the DRAMs 21a, 21b, 21c and 21d, buffers 4a, 4b, 4c and 4d, and cache memories 22a, 22b, 22c and 22d, respectively. A processor bus drawn from the upper side of a CPU 3 is parted right and left into two, and each of the two is further parted into two. The four processor buses $b_1$ are accordingly respectively connected to the buffers 4a, 4b, 4c and 4d, similar to FIG. 18.

[Embodiment 22]

Figure 34:
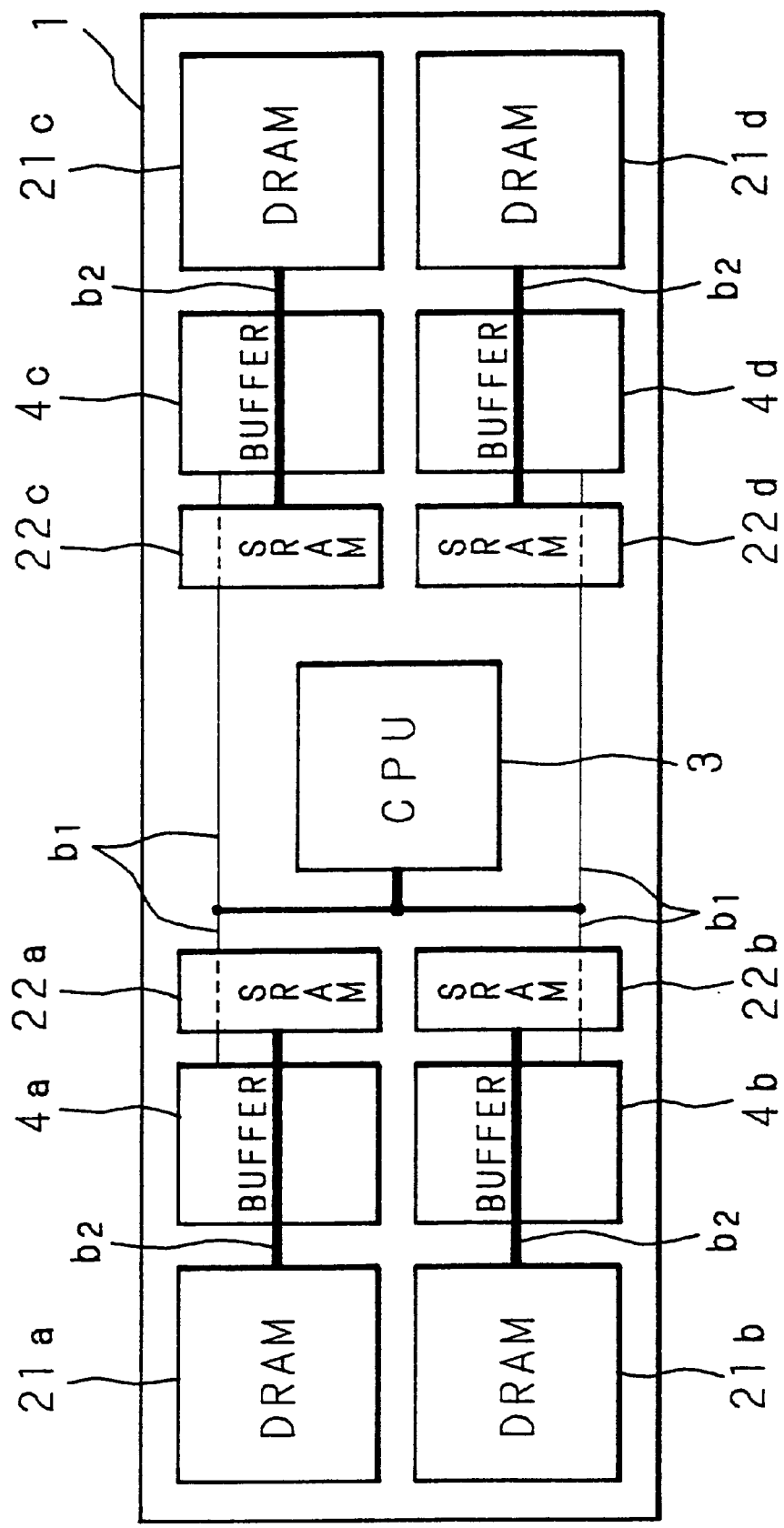
FIG. 34 is a schematic plan view showing a main portion in a microcomputer according to a 22nd embodiment.

FIG. 34 is a schematic layout diagram showing a main portion of a microcomputer according to a 22nd embodiment. Four DRAMs 21a, 21b, 21c and 21d and four cache memories (SRAMs) 22a, 22b, 22c and 22d are shown in FIG. 34, in place of the memory cell regions 2a, 2b, 2c and 2d in FIG. 19. The layout of the DRAMs 21a, 21b, 21c and 21d, the buffers 4a, 4b, 4c and 4d, and the cache memories 22a, 22b, 22c and 22d and the connection therebetween are similar to those in the 21st embodiment. A processor bus drawn from the left side (or right side) of a CPU 3 is parted up and down into two, and each of the two is further parted right and left into two. The four processor buses $b_1$ are respectively connected to the buffers 4a, 4b, 4c and 4d, similar to the embodiment shown in FIG. 19.

[Embodiment 23]

Figure 35:
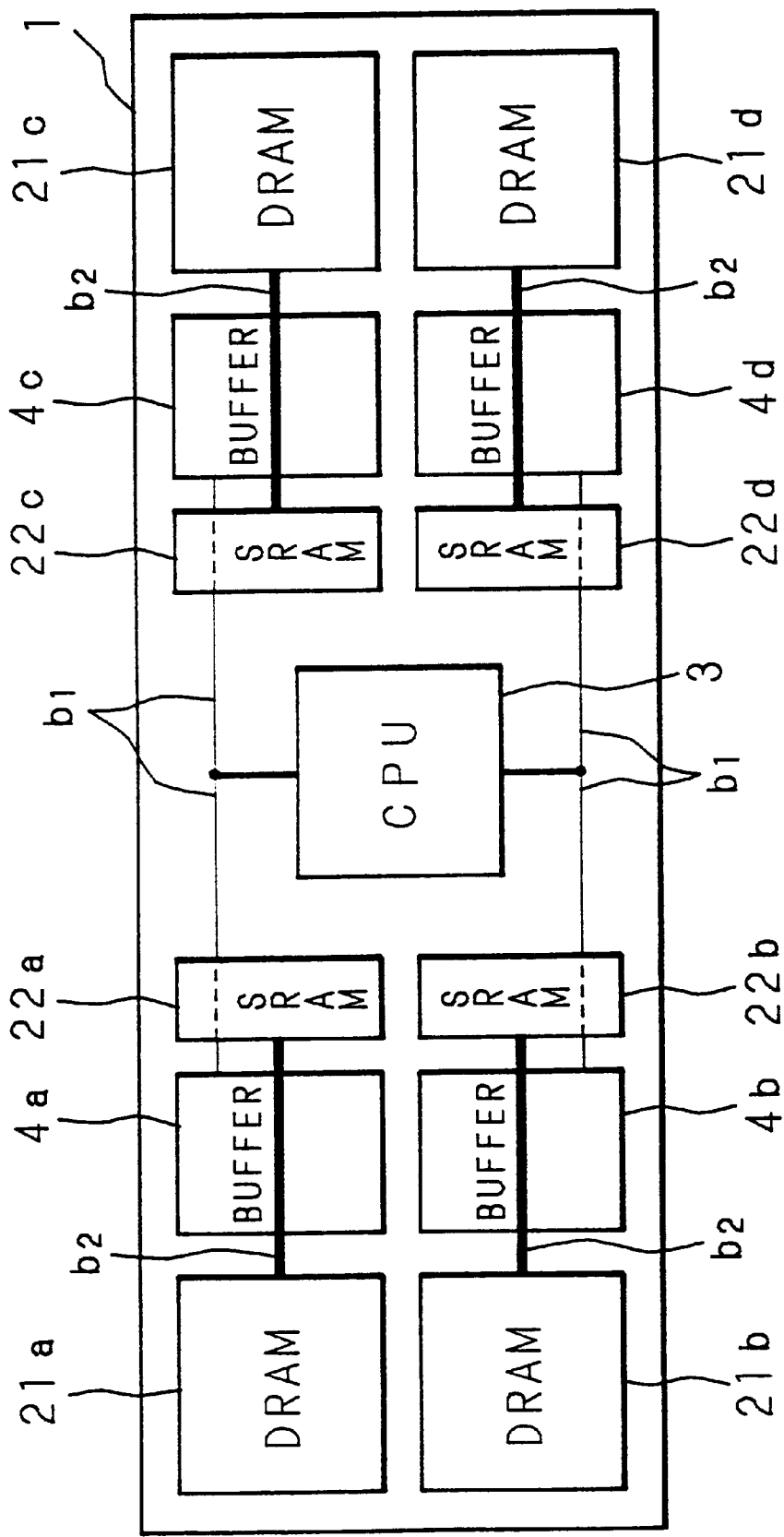
FIG. 35 is a schematic plan view showing a main portion in a microcomputer according to a 23rd embodiment.

FIG. 35 is a schematic layout diagram showing a main portion of a microcomputer according to a 23rd embodiment. Four DRAMs 21a, 21b, 21c and 21d and four cache memories (SRAMs) 22a, 22b, 22c and 22d are shown in FIG. 35, in place of the memory cell regions 2a, 2b, 2c and 2d in FIG. 20. The layout of the DRAMs 21a, 21b, 21c and 21d, buffers 4a, 4b, 4c and 4d, and cache memories 22a, 22b, 22c and 22d and the connection therebetween are similar to those in the 21st embodiment. Each of two processor buses vertically drawn from the upper side and the lower side of a CPU 3 is parted right and left into two. The four processor buses $b_1$ in total are respectively connected to the buffers 4a, 4b, 4c and 4d. similar to the embodiment shown in FIG. 20.

[Embodiment 24]

Figure 36:
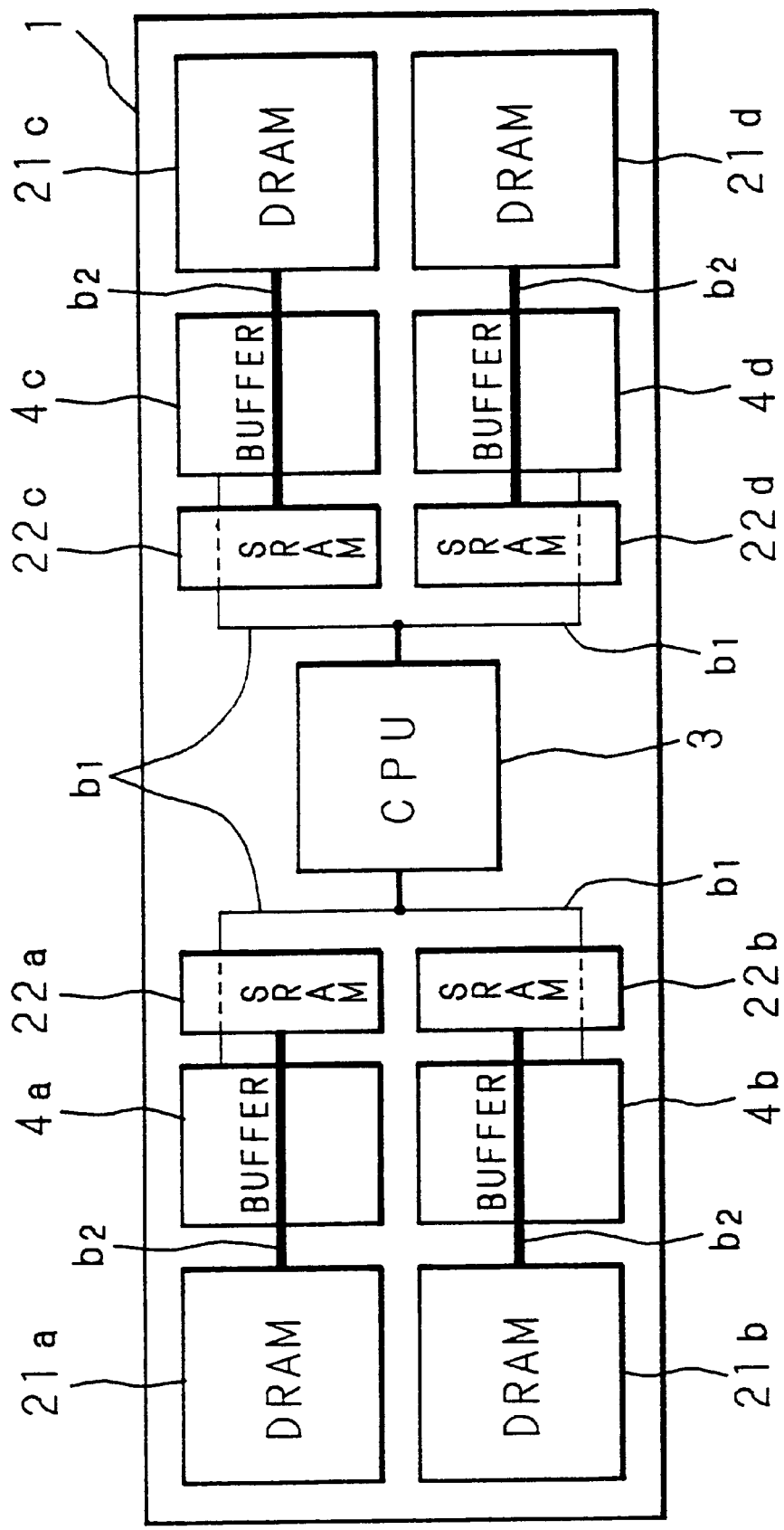
FIG. 36 is a schematic plan view showing a main portion in a microcomputer according to a 24th embodiment.

FIG. 36 is a schematic layout diagram showing a main portion of a microcomputer according to a 24th embodiment. Four DRAMs 21a, 21b, 21c and 21d and four cache memories (SRAMs) 22a, 22b, 22c and 22d are used in FIG. 36 in place of the memory cell regions 2a, 2b, 2c and 2d in FIG. 21. The layout of the DRAMs 21a, 21b, 21c and 21d, buffers 4a, 4b, 4c and 4d, and cache memories 22a, 22b, 22c and 22d and the connection therebetween are similar to those in the 21st embodiment. Two processor buses are horizontally drawn respectively from the right side and the left side of a CPU 3, each of which is parted up and down into two. The four processor buses $b_1$ are accordingly respectively connected to the buffers 4a, 4b, 4c and 4d, similar to FIG. 21.

[Embodiment 25]

Figure 37:
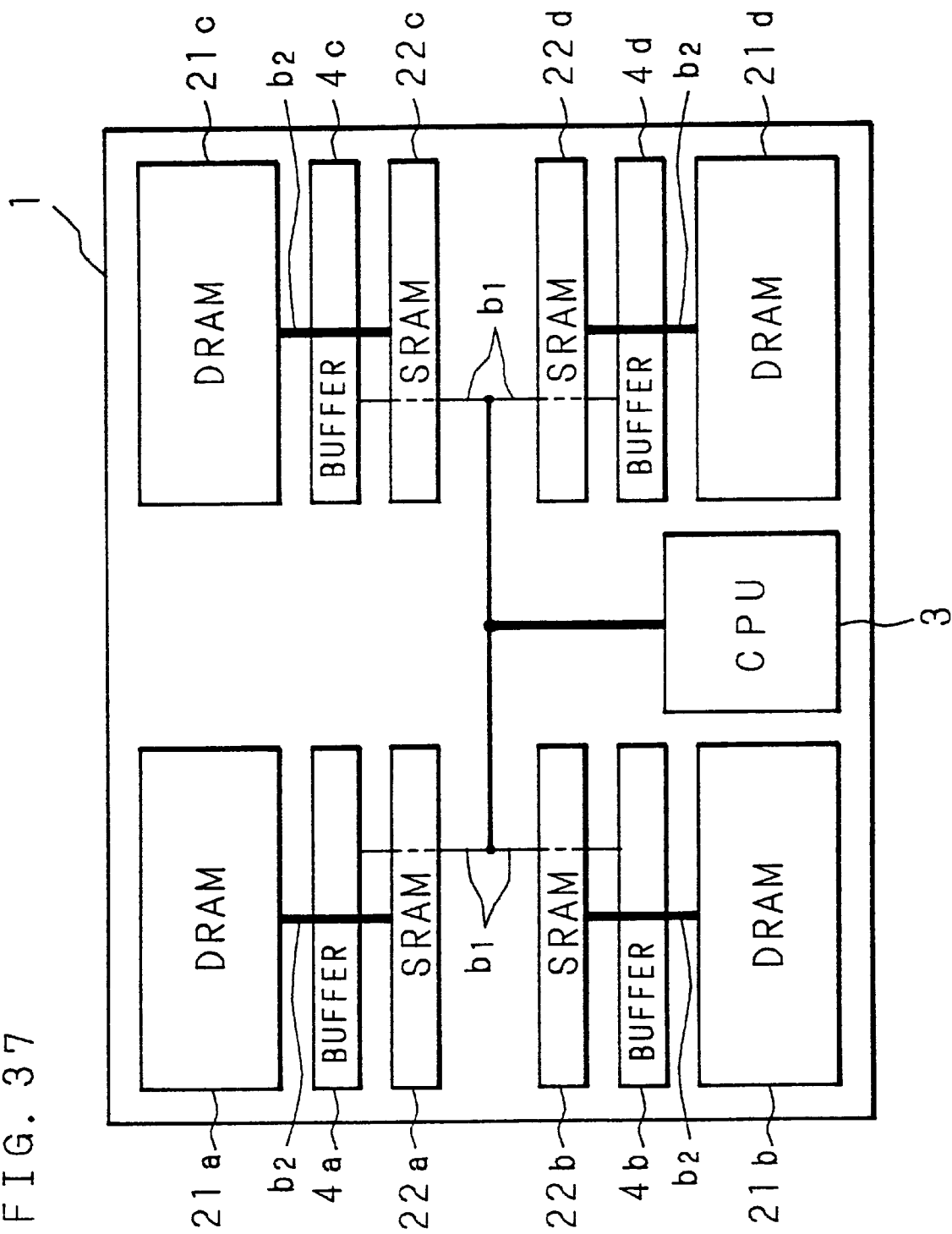
FIG. 37 is a schematic plan view showing a main portion in a microcomputer according to a 25th embodiment.

FIG. 37 is a schematic layout diagram showing a main portion of a microcomputer according to a 25th embodiment. Four DRAMs 21a, 21b, 21c and 21d and four cache memories (SRAMs) 22a, 22b, 22c and 22d are provided in FIG. 37, in place of the memory cell regions 2a, 2b, 2c and 2d in FIG. 22. Memory buses $b_2$ connect the DRAMs 21a, 21b, 21c and 21d, buffers 4a, 4b, 4c and 4d, and cache memories 22a, 22b, 22c and 22d. A processor bus drawn from the upper side of a CPU 3 is parted right and left into two, and each of the two is parted up and down into two. The four processor buses $b_1$ are respectively connected to the buffers 4a, 4b, 4c and 4d, similar to the embodiment shown in FIG. 22.

Since there are provided high-speed memories in the 21st to 25th embodiments, processing is efficiently executed as the transmission speed is changed in accordance with the kind of signals, in addition to the effects in the sixth to tenth embodiments. Each buffer 4a, 4b, 4c, 4d in the 21st to 25th embodiments may include the data buffer 4DB and the instruction buffer 4IQ, whereby the effects in the 11th to 15th embodiments are also achieved.

Further, each buffer may include the bus interface unit 4BIU, as in the 16th to 20th embodiments. Since the layout for this is easily guessed, the description thereof is omitted here. FIG. 13 is an example of the layout. The arrangement accomplishes the effects in the 16th to 20th embodiments as well.

The memory may be various kinds of memories such as EPRAM, ROM, erasable ROM and flash memory as well as DRAM and SRAM.

Although the above-mentioned embodiments use two rows of the memory cell regions, a count of rows may be three or more, and each row may consist of one or, three or more memory cell regions. A count of the memory cell regions is not limited to four.

Since examples based on claims and those in combination of the examples can be easily analogized, while the above-mentioned examples are not all of the invention, the illustration and description thereof will be omitted.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of claims, or equivalence of such metes and bounds thereof are therefore intended to be embraced by the claims.

What is claimed is:

1. A microcomputer, comprising:
   a processor;
   a memory comprising a plurality of memory regions;
   a plurality of buffers, each including a selector for changing a bus width;
   at least one processor bus for connecting said processor and said plurality of buffers; and
   a plurality of memory buses, each connecting one of said memory regions and a respective one of said plurality of buffers,
   wherein
   said processor, memory, plurality of buffers, at least one processor bus and plurality of memory buses are integrated on the same substrate,
   said processor is arranged on said substrate in a space between said memory regions, and
   said processor bus has a smaller width than that of each of said memory buses.

2. A microcomputer according to claim 1, wherein each buffer includes a latch means for latching a signal.

3. A microcomputer according to claim 2, further comprising:
   at least one bus interface unit which includes a selector for changing a bus width and which is used for inputting/outputting an external signal; and
   an external bus connected to said at least one bus interface unit,
   wherein said at least one bus interface unit is connected to one of said memory regions via one of said memory buses, and
   said external bus has a smaller width than that of said one memory bus.

4. A microcomputer according to claim 3, wherein said at least one bus interface unit includes a latch means for latching a signal.

5. A microcomputer according to claim 1, wherein at least one of said memory regions includes a high-speed memory operating at a high speed and a low-speed memory operating at a low speed.

6. A microcomputer according to claim 1, wherein at least one of said memory regions includes a large-capacity memory and a small-capacity memory.

7. A microcomputer according to claim 1, wherein said memory is arranged into a plurality of memory region rows, and said processor is disposed in a space between said memory region rows.

8. A microcomputer according to claim 1, wherein said memory is arranged into two memory regions rows, and said processor is disposed in a space between said memory region rows.

9. A microcomputer according to claim 1, wherein each of said buffers is located proximate to a memory region.

10. A microcomputer according to claim 9, wherein there are provided four or more memory regions,
    each region having the buffer located proximate to an inner short side thereof, and
    said at least one processor bus is drawn out from one side of said processor.

11. A microcomputer according to claim 9, wherein there are provided four or more memory regions,
    each region having the buffer located proximate to an inner short side thereof, and
    said at least one processor bus is drawn out from two sides of said processor.

12. A microcomputer according to claim 9, wherein there are provided four or more memory regions,
    each region having the buffer located proximate to an inner long side thereof, and
    said at least one processor bus is drawn out from one side of said processor.

13. A microcomputer according to claim 1, wherein there are provided four or more memory regions,
    each region having the buffer located proximate to an inner short side thereof, and
    said at least one processor bus is drawn out from one side of said processor.

14. A microcomputer according to claim 1, wherein there are provided four or more memory regions,
    each region having the buffer located proximate to an inner short side thereof, and
    said at least one processor bus is drawn out from two sides of said processor.

15. A microcomputer according to claim 1, wherein there are provided four or more memory regions,
    each region having the buffer located proximate to an inner long side thereof, and
    said at least one processor bus is drawn out from one side of said processor.

16. A microcomputer, comprising:
    a processor;
    a memory;
    a buffer including a selector for changing a bus width;
    a processor bus for connecting said processor and said buffer; and
    a memory bus for connecting said memory and said buffer,
    wherein said processor, memory, buffer, processor bus and memory bus are integrated on the same substrate,
    said processor bus has a smaller width than that of said memory bus,
    said buffer includes a data buffer for data signals and an instruction buffer for instruction signals, and
    said data buffer and said instruction buffer are connected to said processor independently of each other.

17. A microcomputer according to claim 16, wherein said processor is so constructed that said data buffer and said instruction buffer are accessed independently, and simultaneously when needed.

18. microcomputer according to claim 17, further comprising:
a bus interface unit which includes a selector for changing a bus width and which is used for inputting/outputting an external signal; and
an external bus connected to said bus interface unit,
wherein said bus interface unit is connected to said memory via said memory bus, and
said external bus has a smaller width than that of said memory bus.

19. A microcomputer according to claim 18, wherein said bus interface unit includes a latch means for latching a signal.

20. A microcomputer according to claim 16, further comprising:
a bus interface unit which includes a selector for changing a bus width and which is used for inputting/outputting an external signal; and
an external bus connected to said bus interface unit,
wherein said bus interface unit is connected to said memory via said memory bus, and
said external bus has a smaller width than that of said memory bus.

21. A microcomputer according to claim 20, wherein said bus interface unit includes a latch means for latching a signal.

22. A microcomputer, comprising:
a processor;
a memory;
a buffer including a selector for changing a bus width;
a processor bus for connecting said processor and said buffer; and
a memory bus for connecting said memory and said buffer,
wherein said processor, memory, buffer, processor bus and memory bus are integrated on the same substrate,
said processor bus has a smaller width than that of said memory bus,
said buffer includes a latch means for latching a signal,
said buffer includes a data buffer for data signals and an instruction buffer for instruction signals, and
said data buffer and said instruction buffer are connected to said processor independently of each other.

23. A microcomputer according to claim 22, wherein said processor is so constructed that said data buffer and said instruction buffer are accessed independently, and simultaneously when needed.

24. A microcomputer according to claim 23, further comprising:
a bus interface unit which includes a selector for changing a bus width and which is used for inputting/outputting an external signal; and
an external bus connected to said bus interface unit,
wherein said bus interface unit is connected to said memory via said memory bus, and
said external bus has a smaller width than that of said memory bus.

25. A microcomputer according to claim 24, wherein said bus interface unit includes a latch means for latching a signal.

26. A microcomputer according to claim 22, further comprising:
a bus interface unit which includes a selector for changing a bus width and which is used for inputting/outputting an external signal; and
an external bus connected to said bus interface unit,
wherein said bus interface unit is connected to said memory via said memory bus, and
said external bus has a smaller width than that of said memory bus.

27. A microcomputer according to claim 26, wherein said bus interface unit includes a latch means for latching a signal.

28. A microcomputer comprising:
a processor;
a memory;
a buffer including a selector for changing a bus width;
a processor bus for connecting said processor and said buffer;
a memory bus for connecting said memory and said buffer;
a bus interface unit which includes a selector for changing a bus width and which is used for inputting/outputting an external signal; and
an external bus connected to said bus interface unit,
wherein said processor, memory, buffer, processor bus and memory bus are integrated on the same substrate,
said processor bus has a smaller width than that of said memory bus,
said bus interface unit is connected to said memory via said memory bus, and
said external bus has a smaller width than that of said memory bus.

29. A microcomputer according to claim 28, wherein said bus interface unit includes a latch means for latching a signal.

30. A microcomputer according to claim 28, wherein said memory is arranged into two memory regions rows, and said processor is disposed in a space between said memory region rows.

31. A microcomputer according to claim 30, wherein said bus interface unit is located proximate to said memory or said memory region.

32. A microcomputer according to claim 31, wherein there are provided four or more memory regions,
each region having the buffer located proximate to an inner short side thereof, and
said processor bus is drawn out from one side of said processor.

33. A microcomputer according to claim 31, wherein there are provided four or more memory regions,
each region having the buffer located proximate to an inner short side thereof, and
said processor bus is drawn out from two sides of said processor.

34. A microcomputer according to claim 31, wherein there are provided four or more memory regions,
each region having the buffer located proximate to an inner long side thereof, and
said processor bus is drawn out from one side of said processor.

35. A microcomputer according to claim 28, wherein said bus interface unit is located proximate to said memory.

36. A microcomputer according to claim 35, wherein there are provided four or more memory regions, each region having the buffer located proximate to an inner short side thereof, and said processor bus is drawn out from one side of said processor.

37. A microcomputer according to claim 35, wherein there are provided four or more memory regions, each region having the buffer located proximate to an inner short side thereof, and said processor bus is drawn out from two sides of said processor.

38. A microcomputer according to claim 35, wherein there are provided four or more memory regions, each region having the buffer located proximate to an inner long side thereof, and said processor bus is drawn out from one side of said processor.

* * * * *